US008392987B2

(12) United States Patent
Sasamura et al.

(10) Patent No.: US 8,392,987 B2
(45) Date of Patent: Mar. 5, 2013

(54) WEB PAGE SAFETY JUDGMENT SYSTEM

(75) Inventors: Naoki Sasamura, Tokyo (JP); Masahiro Suzuki, Tokyo (JP); Kouki Miyamoto, Tokyo (JP); Yuuji Aoyagi, Tokyo (JP); Takuya Nishio, Tokyo (JP); Go Mase, Tokyo (JP); Takayuki Sugimori, Tokyo (JP)

(73) Assignees: NEC BIGLOBE, Ltd., Tokyo (JP); NEC Informatec Systems, Ltd., Tokyo (JP)

( * ) Notice: Subject to any disclaimer, the term of this patent is extended or adjusted under 35 U.S.C. 154(b) by 1107 days.

(21) Appl. No.: 12/341,793

(22) Filed: Dec. 22, 2008

(65) Prior Publication Data
US 2009/0165100 A1    Jun. 25, 2009

(30) Foreign Application Priority Data
Dec. 21, 2007    (JP) .................................. 2007-331134

(51) Int. Cl.
*G06F 7/04*        (2006.01)
*G08B 23/00*       (2006.01)
(52) U.S. Cl. .................. 726/22; 726/5; 726/23; 726/26; 726/27
(58) Field of Classification Search .................. 726/2–7, 726/22, 23, 25–29
See application file for complete search history.

(56) References Cited

U.S. PATENT DOCUMENTS

| | | | | |
|---|---|---|---|---|
| 6,356,909 B1 * | 3/2002 | Spencer | .............................. | 1/1 |
| 7,209,944 B2 * | 4/2007 | Ogasawara | ................... | 709/203 |
| 7,681,234 B2 * | 3/2010 | Florencio et al. | ............... | 726/22 |
| 2002/0162009 A1 * | 10/2002 | Shmueli et al. | ............... | 713/200 |
| 2006/0174119 A1 * | 8/2006 | Xu | ................................... | 713/170 |
| 2006/0225136 A1 * | 10/2006 | Rounthwaite et al. | .......... | 726/26 |
| 2006/0271861 A1 * | 11/2006 | Yolleck et al. | ................ | 715/760 |
| 2007/0006305 A1 * | 1/2007 | Florencio et al. | ............... | 726/22 |
| 2007/0094727 A1 * | 4/2007 | Singh | .............................. | 726/22 |
| 2007/0177054 A1 * | 8/2007 | Jen | ................................. | 348/448 |
| 2008/0183745 A1 * | 7/2008 | Cancel et al. | ..................... | 707/102 |
| 2008/0276308 A1 * | 11/2008 | Graser et al. | ....................... | 726/6 |
| 2009/0271842 A1 * | 10/2009 | Baumhof | ........................... | 726/1 |
| 2010/0175136 A1 * | 7/2010 | Frumer et al. | .................... | 726/26 |

FOREIGN PATENT DOCUMENTS

| | | |
|---|---|---|
| JP | 2006087908 A | 4/2006 |
| JP | 2007018385 A | 1/2007 |
| JP | 2007179206 A | 7/2007 |
| JP | 2007226608 A | 9/2007 |
| JP | 2009517723 A | 4/2009 |
| JP | 2009134404 A | 6/2009 |
| WO | WO 2007060034 A1 * | 5/2007 |

OTHER PUBLICATIONS

Japanese Offce Action for JP2007-331134 mailed Jan. 5, 2010.

* cited by examiner

*Primary Examiner* — Tae Kim

(57) ABSTRACT

A user terminal displays on its display unit a target web page including an authentication information input field into which input authentication information is inputted by the user terminal. The user terminal judges first to third validity levels for a plurality of login history information by referring to a login information list and a service group information. The user terminal selects a corresponding process from a plurality of predetermined processes for the input authentication information based on existence or absence of the login history information in the first or second validity level and on a result of checking the input authentication information with login information in the login history information in the first to third validity levels. The user terminal executes the corresponding process.

17 Claims, 12 Drawing Sheets

Fig. 4

LOGIN INFORMATION LIST  40

| LOGIN HISTORY INFORMATION | USER IDENTIFICATION | AUTHENTICATION INFORMATION (ID-LI) | | BROWSED URL (WPU-LI) | VALIDITY LEVEL |
| --- | --- | --- | --- | --- | --- |
| | | ID | PASSWORD | | |
| LOGIN HISTORY INFORMATION Z | U001 | admin | adminpass | http://AAA.com/index.html<br>http://BBB.com/ | |
| LOGIN HISTORY INFORMATION P | U001 | adminP | adminpassP | http://ppp.com/MY_PAGE/Signin?ID%... | |
| LOGIN HISTORY INFORMATION Q | U001 | adminQ | adminpassQ | http://qqq.com/ME_PAGE/Signin?ID%... | |
| LOGIN HISTORY INFORMATION R | U001 | adminR | adminpassR | http://rrr.com/I_PAGE/Signin?ID%... | |

SERVICE GROUP INFORMATION LIST

| SERVICE GROUP | SERVICE URL |
|---|---|
| SERVICE GROUP X | https://AAA.com/index.html<br>http://TTT.co.eu/<br>http://CCC.co.jp/top/top.html |
| SERVICE GROUP Y | http://BBB.com/<br>http://SSS.co.ru/top.html |

Fig. 10

LOGIN INFORMATION LIST

| LOGIN HISTORY INFORMATION | USER IDENTIFICATION | AUTHENTICATION INFORMATION (ID-LI) | | BROWSED URL (WPU-LI) | VALIDITY LEVEL |
|---|---|---|---|---|---|
| | | ID | PASSWORD | | |
| LOGIN HISTORY INFORMATION Z | U001 | admin | adminpass | http://AAA.com/index.html<br>http://BBB.com/ | 3 |
| LOGIN HISTORY INFORMATION P | U001 | adminP | adminpassP | http://ppp.com/MY_PAGE/Signin?ID%... | 1 |
| LOGIN HISTORY INFORMATION Q | U001 | adminQ | adminpassQ | http://qqq.com/ME_PAGE/Signin?ID%... | 3 |
| LOGIN HISTORY INFORMATION R | U001 | adminR | adminpassR | http://rrr.com/I_PAGE/Signin?ID%... | 3 |

Fig. 11

LOGIN INFORMATION LIST

| LOGIN HISTORY INFORMATION | USER IDENTIFICATION | AUTHENTICATION INFORMATION (ID-LI) | | BROWSED URL (WPU-LI) | VALIDITY LEVEL |
|---|---|---|---|---|---|
| | | ID | PASSWORD | | |
| LOGIN HISTORY INFORMATION Z | U001 | admin | adminpass | http://AAA.com/index.html<br>http://BBB.com/ | 2 |
| LOGIN HISTORY INFORMATION P | U001 | adminP | adminpassP | http://ppp.com/MY_PAGE/Signin?ID%··· | 3 |
| LOGIN HISTORY INFORMATION Q | U001 | adminQ | adminpassQ | http://qqq.com/ME_PAGE/Signin?ID%··· | 3 |
| LOGIN HISTORY INFORMATION R | U001 | adminR | adminpassR | http://rrr.com/I_PAGE/Signin?ID%··· | 3 |

Fig. 12

LOGIN INFORMATION LIST

| LOGIN HISTORY INFORMATION | USER IDENTIFICATION | AUTHENTICATION INFORMATION (ID-LI) | | BROWSED URL (WPU-LI) | VALIDITY LEVEL |
|---|---|---|---|---|---|
| | | ID | PASSWORD | | |
| LOGIN HISTORY INFORMATION Z | U001 | admin | adminpass | http://AAA.com/index.html<br>http://BBB.com/ | 3 |
| LOGIN HISTORY INFORMATION P | U001 | adminP | adminpassP | http://ppp.com/MY_PAGE/Signin?ID%··· | 3 |
| LOGIN HISTORY INFORMATION Q | U001 | adminQ | adminpassQ | http://qqq.com/ME_PAGE/Signin?ID%··· | 3 |
| LOGIN HISTORY INFORMATION R | U001 | adminR | adminpassR | http://rrr.com/I_PAGE/Signin?ID%··· | 3 |

WEB PAGE SAFETY JUDGMENT SYSTEM

INCORPORATION BY REFERENCE

This application is based upon and claims the benefit of priority from Japanese patent application No. 2007-331134, filed on Dec. 21, 2007, the disclosure of which is incorporated herein in its entirely by reference.

TECHNICAL FIELD

The present invention relates to a web page safety judgment system for judging safety of a web page displayed on a user terminal.

BACKGROUND ART

A system including a service providing web server and a user terminal is known. The service providing web server retains set authentication information and a target web page as a web page and publishes the target web page on a network. The user terminal displays the target web page on its display unit. The target web page includes an authentication information input field, and the user terminal, in order to receive a predetermined service, inputs input authentication information into the authentication information input field and transmits it as transmission authentication information. When the transmission authentication information agrees with the set authentication information, the service providing web server provides a predetermined service to the user terminal.

Before transmitting the input authentication information inputted into the authentication information input field as the transmission authentication information, the user terminal judges safety based on a blacklist (refer to, for example, Japanese Laid Open Patent Application (JP-P2007-226608A)). A harmful URL (Uniform Resource Locator) identifying a harmful web page is registered in the blacklist. When a target URL identifying a target web page displayed on the display unit agrees with the harmful URL, the user terminal cancels the transmission of the input authentication information inputted into the authentication information input field.

However, there is a case that the target web page displayed on the display unit is a harmful web page but the target URL is not registered as a harmful URL in the blacklist. In this case, the user terminal does not hit any URL when using the blacklist. That is, the target URL identifying the target web page displayed on the display unit does not agree with any harmful URL. For this reason, the user terminal transmits, to the harmful web page, the input authentication information inputted into the authentication information input field as the transmission authentication information. As described above, the user terminal imprudently transmits the authentication information of a user, and thus safety of the authentication information is not secured.

On the other hand, it can be considered to use a whitelist provided by a third party. However, it is difficult to judge whether the third party is truly trustworthy and there is a limitation in checking innumerable number of web pages.

As described above, a system is desired which can secure higher safety of authentication information in compared with a system using a blacklist (or whitelist).

Japanese Laid Open Patent Application (JP-P2007-226608A) discloses a site management system. The site management system includes: database means for registering a web site judged as an inappropriate access target; web site access means for accessing the web site registered in the database means via communication circuits; and database update means for deleting the web site as the target of the access from the database means based on the result of the access.

SUMMARY

An exemplary object of the invention is to provide a web page safety judgment system, a web page safety judgment method and a recording medium recording a computer program of the method, which are able to secure higher safety of authentication information in compared with a system using a blacklist.

A web page safety judgment system according to an exemplary aspect of the invention includes a user terminal that is connected via a network to a service providing web server which publishes a target web page on the network. The target web page includes an authentication information input field into which input authentication information is inputted by the user terminal. The user terminal includes a first validity judgment process part, a second validity judgment process part, a third validity judgment process part, a safety process part, a display unit that displays the target web page published on the network, and a storage unit that stores a login information list and a service group information list. The login information list registers a plurality of login history information respectively including a plurality of authentication information and browsed URLs (Uniform Resource Locators) identifying web pages browsed on the display unit before. The service group information list registers service groups each of which includes service URLs respectively identifying web pages for which authentication is performed based on a common authentication information. The first validity judgment process unit checks a target URL identifying the target web page displayed on the display unit with the browsed URLs and judges login history information of the plurality of login history information, which includes a browsed URL agreeing with the target URL, is a first validity level. The second validity judgment process part selects, from the service groups, first service groups each of which includes a service URL agreeing with one of the browsed URLs. The second validity judgment process part checks the target URL with service URLs included in the first service groups and selects, from the first service groups, a second service group including a service URL agreeing with the target URL. The second validity judgment process part judges login history information of the plurality of login history information, which includes a browsed URL agreeing with a service URL included in the second service group, is a second validity level. The third validity judgment process part judges login history information of the plurality of login history information, which is other than the login history information in the first validity level or the second validity level, is a third validity level. The safety process part selects a corresponding process from a plurality of predetermined processes for the input authentication information based on existence or absence of the login history information in the first validity level or in the second validity level and on a result of checking the input authentication information with login information in the login history information in the first to third validity levels. The safety process part executes the corresponding process.

A web page safety judgment method according to a exemplary aspect of the invention includes: displaying, on a display unit, a target web page published on a network by a service providing web server and including an authentication information input field into which authentication information is inputted; referring to a login information list that registers a plurality of login history information respectively including a plurality of authentication information and browsed URL (Uniform Resource Locator)s identifying web pages browsed on the display unit before; checking a target URL identifying the target web page displayed on the display unit with the browsed URLs; judging login history information of the plurality of login history information, which includes a browsed URL agreeing with the target URL, is a first validity level; referring to a service group information list that registers service groups each of which includes service URLs respectively identifying web pages for which authentication is performed based on a common authentication information; selecting, from the service groups, first service groups each of which includes a service URL agreeing with one of the browsed URLs; checking the target URL with service URLs included in the first service groups; selecting, from the first service groups, a second service group including a service URL agreeing with the target URL; judging login history information of the plurality of login history information, which includes a browsed URL agreeing with a service URL included in the second service group, is a second validity level; judging a login history information of the plurality of login history information, which is other than the login history information in the first validity level or the second validity level, is a third validity level; selecting a corresponding process from a plurality of predetermined processes for the input authentication information based on existence or absence of the login history information in the first validity level or in the second validity level and on a result of checking the input authentication information with login information in the login history information in the first to third validity levels; and executing the corresponding process.

A recording medium according to an exemplary aspect of the invention, which records a computer-readable program that when executed causes a computer to perform a web page safety judgment method. The web page safety judgment method includes: displaying, on a display unit, a target web page published on a network by a service providing web server and including an authentication information input field into which authentication information is inputted; referring to a login information list that registers a plurality of login history information respectively including a plurality of authentication information and browsed URL(Uniform Resource Locator)s identifying web pages browsed on the display unit before; checking a target URL identifying the target webpage displayed on the display unit with the browsed URLs; judging a login history information of the plurality of login history information, which includes a browsed URL agreeing with the target URL, is a first validity level; referring to a service group information list that registers service groups each of which includes service URLs respectively identifying web pages for which authentication is performed based on a common authentication information; selecting, from the service groups, first service groups each of which includes a service URL agreeing with one of the browsed URLs; checking the target URL with service URLs included in the first service groups; selecting, from the first service groups, a second service group including a service URL agreeing with the target URL; judging a login history information of the plurality of login history information, which includes a browsed URL agreeing with a service URL included in the second service group, is a second validity level; judging a login history information of the plurality of login history information, which is other than the login history information in the first validity level or the second validity level, is a third validity level; selecting a corresponding process from a plurality of predetermined processes for the input authentication information based on existence or absence of the login history information in the first validity level or in the second validity level and on a result of checking the input authentication information with login information in the login history information in the first to third validity levels; and executing the corresponding process.

According to the web page safety judgment system, the method and the recording medium, as described above, the user terminal judges the above mentioned first to third validity levels by referring to the login information list and the service group information list, and generates a check result by checking the input authentication information with the authentication information of the login history information in the first to third validity levels. Then, the user terminal selects a corresponding process from a plurality of predetermined processes for the input authentication information based on existence or absence of the login history information in the first validity level or in the second validity level and on the above result of checking, and executes the selected process. Here, when it is judged to be safe to transmit the input authentication information as transmission authentication information for the target web page, the input authentication information inputted into the authentication information input field is transmitted as the transmission authentication information in the corresponding process. When it is judged to be risky to transmit the input authentication information as the transmission authentication information for the target web page, a transmission of the transmission authentication information is cancelled in the corresponding process. This can secure a higher safety of the authentication information in compared with the judgment using the blacklist, in which no hit may occur. In addition, a higher safety of the authentication information can be secured in compared with the judgment using a whitelist, since it is difficult to judge whether a third party providing the whitelist is truly trustworthy and there is a limitation in checking innumerable number of web pages.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 4 shows a login information list 40 corresponding to user terminal 1 "U001";

FIG. 5 shows a service group information list 50;

FIG. 10 shows the login information list 40 corresponding to the user terminal 1 "U001" for explaining case A as a specific example of the operation of the web page safety judgment system according to first to third exemplary embodiments of the present invention;

FIG. 11 shows the login information list 40 corresponding to the user terminal 1 "U001" for explaining case B as a specific example of the operation of the web page safety judgment system according to first to third exemplary embodiments of the present invention; and FIG. 12 shows the login information list 40 corresponding to the user terminal 1 "U001" for explaining case C as a specific example of the operation of the web page safety judgment system according to first to third exemplary embodiments of the present invention.

EXEMPLARY EMBODIMENTS

Hereinafter, a web page safety judgment system according to exemplary embodiments of the present invention will be described with reference to the attached drawings.

(First Exemplary Embodiment)
[Configuration]

Figure 1:
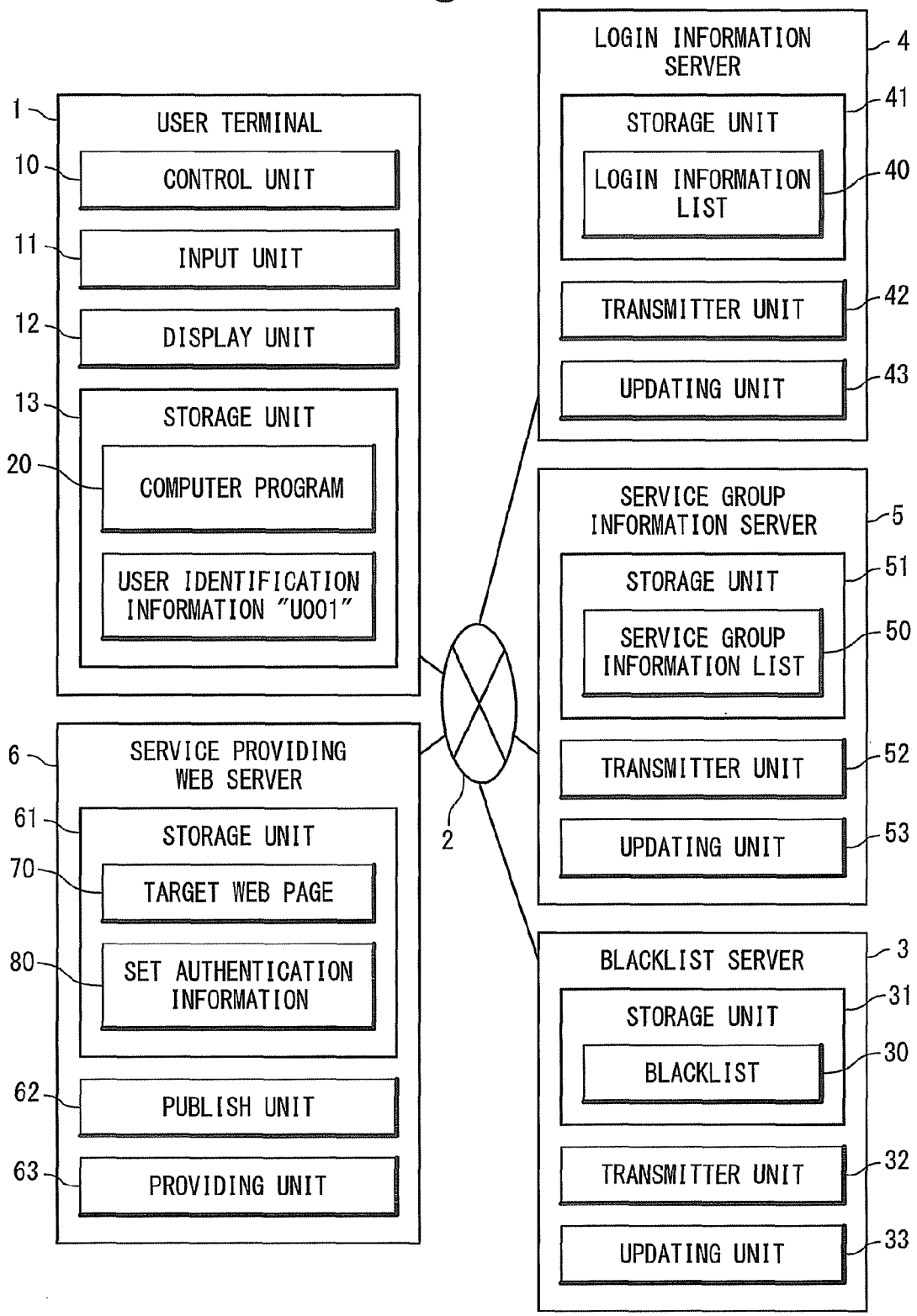
FIG. 1 shows a configuration of a web page safety judgment system according to first to third exemplary embodiments of the present invention.

FIG. 1 shows a configuration of a web page safety judgment system according to a first exemplary embodiment of the present invention. The web page safety judgment system according to the first exemplary embodiment of the present invention includes a plurality of user terminals 1 (only one of the terminals 1 is shown in the figure), a login information server 4, a service group information server 5, a blacklist server 3, and a service providing web server 6. The plurality of the user terminals 1, the login information server 4, the service group information server 5, the blacklist server 3, and the service providing web server 6 are connected to a network 2, respectively. In the present invention, the login information server 4, the service group information server 5, and the blacklist server 3 may be realized not only by separated servers but also by one server.

Each of the user terminals 1 is a computer, a television having a network connecting function, a portable terminal such as portable phone, or the like. Each user terminal 1 includes a control unit 10, an input unit 11, a display unit 12, a storage unit 13, and a communication unit (not shown in the figure) for transmitting and receiving data and information to and from an outside. A CPU (Central Processing Unit) is exemplified as the control unit 10. A keyboard or a pointing device such as mouse is exemplified as the input unit 11. The storage unit 13 stores a computer program 20 as software to be executed by the control unit 10. The computer program 20 may be recorded in a recording medium (not shown). In addition, each user terminal 1 retains user identification information for identifying itself. The user identification information is composed, for example, of a unique alphanumeric string indicating a user ID (identification), hardware of the user terminal 1, software of the user terminal 1, or so on. For example, one of the user terminals 1 stores "U001" as the user identification information in the storage unit 13.

Figure 2:
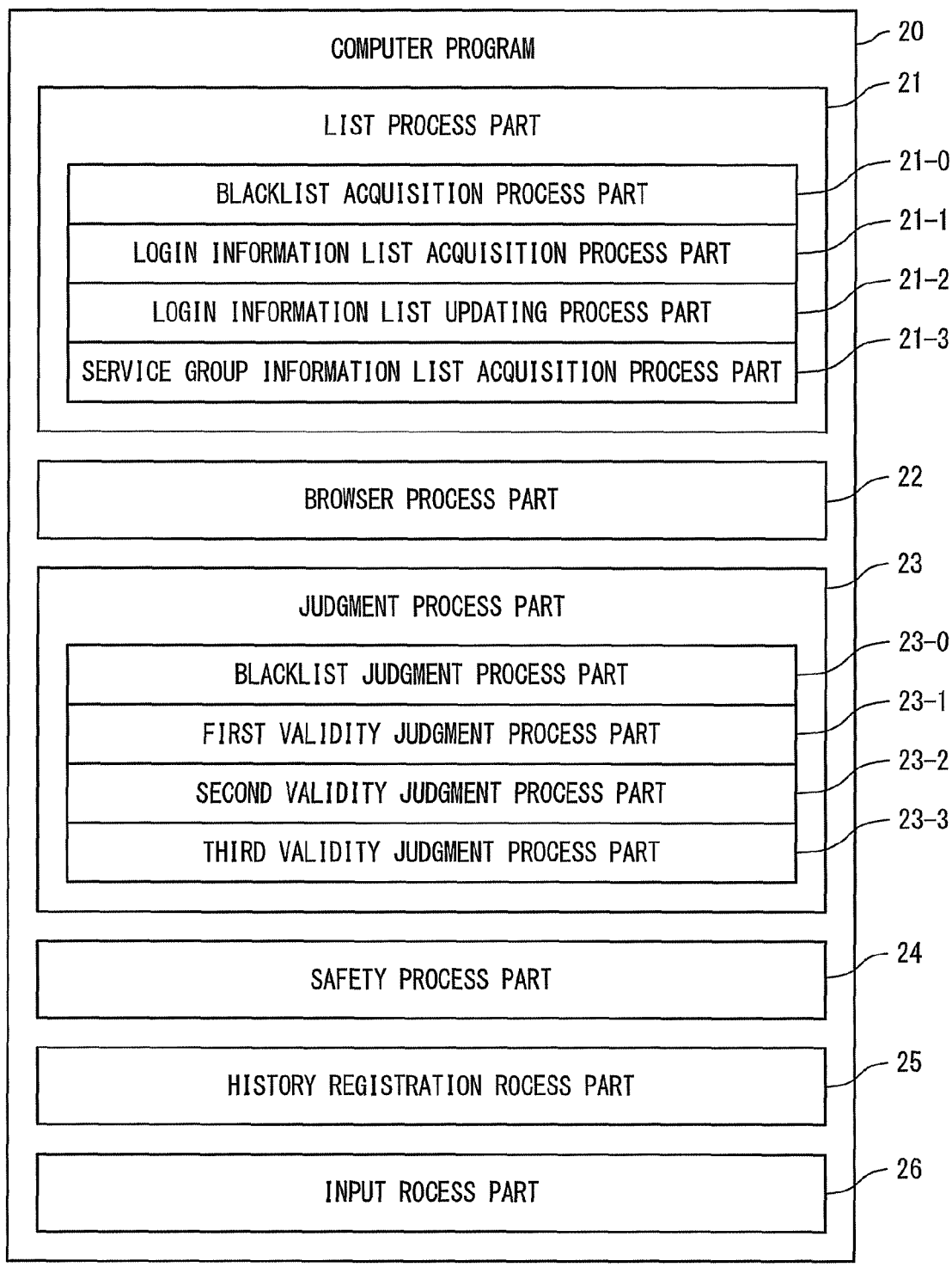
FIG. 2 shows a computer program 20 installed in a user terminal 1 of the web page safety judgment system according to the first exemplary embodiment of the present invention.

As shown in FIG. 2, the computer program 20 includes a list process part 21, a browser process part 22, a judgment process part 23, a safety process part 24, a history registration process part 25, and an input process part 26. The list process part 21 includes a blacklist acquisition process part 21-0, a login information list acquisition process part 21-1, a login information list updating process part 21-2, and a service group information list acquisition process part 21-3. The judgment process part 23 includes a blacklist judgment process part 23-0, a first validity judgment process part 23-1, a second validity judgment process part 23-2, and a third validity judgment process part 23-3. An operation based on the computer program 20 will be described below.

Figure 3:
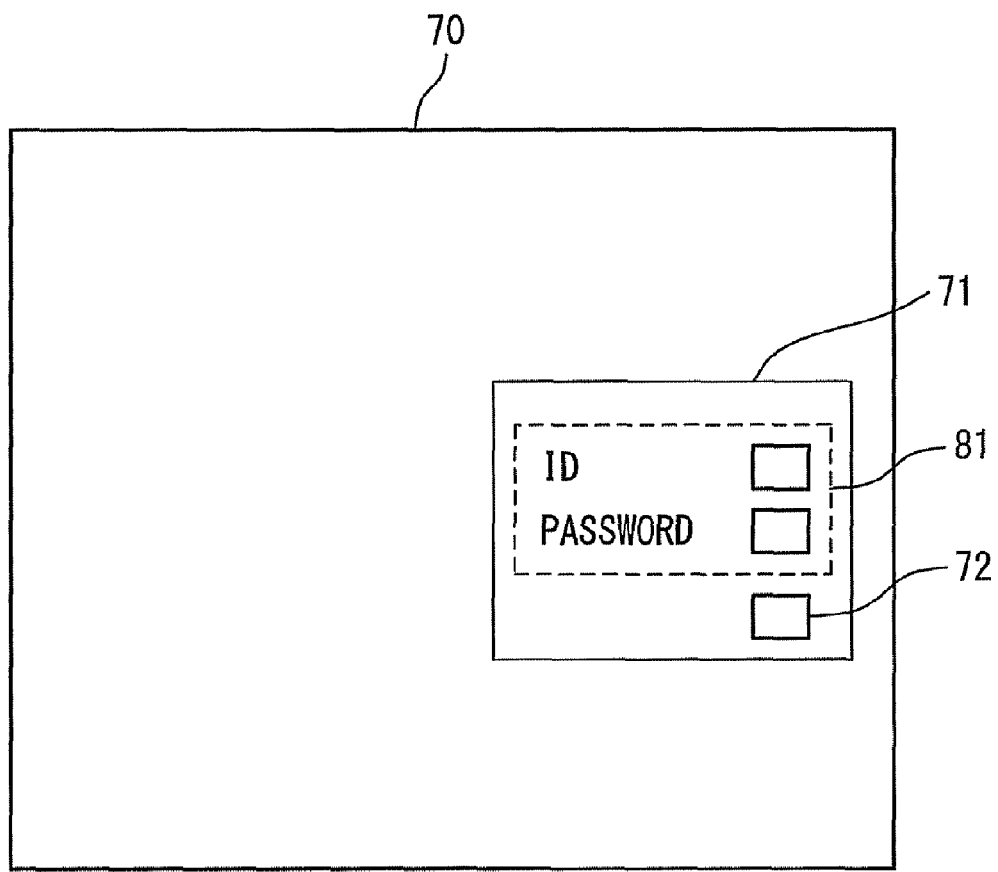
FIG. 3 shows a target web page 70.

The service providing web server 6 is a computer and includes a storage unit 61, a publish unit 62, and a providing unit 63. In the storage unit 61, a target web page 70 as a web page and set authentication information 80 are registered. The set authentication information 80, for example, is authentication information registered in advance by the user terminal 1 "U001" of the user terminals 1. The set authentication information 80 differs for every service providing web server 6. As shown in FIG. 3, the target web page 70 includes a authentication information input field 71 into which input authentication information 81 is inputted by the user terminal 1 and a transmission button 72. When the transmission button 72 is pressed by a user, the input authentication information 81 is transmitted as transmission authentication information. Each of the set authentication information 80 and the input authentication information 81 include a user ID and a password. The publish unit 62 publishes the target web page 70 registered in the storage unit 61 on the network 2. Here, the publishing includes a process in which the publish unit 62 transmits the target web page 70 to the user terminal 1 based on a request from the user terminal 1. When the set authentication information 80 registered in the storage unit 61 agrees with the input authentication information 81 transmitted as the transmission authentication information from the user terminal 1, the providing unit 63 provides a predetermined service to the user terminal 1. The predetermined service, for example, is a provision of contents such as a shopping system for members, a dynamic image file, a music file, and a bulletin board. By the way, it is possible that a portion (storage region) of the storage unit 61, in which the set authentication information 80 is registered, and a portion (check function) of the providing unit 63, which checks the transmission authentication information with the set authentication information 80 are configured in a server; and a portion (publish function) of the publish unit 62, which publishes the target web page 70 on the network 2 is configured in another server.

The blacklist server 3 is a computer and includes a blacklist storage unit (hereinafter referred to as a storage unit) 31, a blacklist transmitter unit (hereinafter referred to as a transmitter unit) 32, and a blacklist updating unit (hereinafter referred to as an updating unit) 33. The storage unit 31 stores a blacklist 30. In the blacklist 30, harmful URLs (Uniform Resource Locators) identifying harmful web pages are registered. The transmitter unit 32 transmits a copy of the blacklist 30 stored in the storage unit 31 to the user terminal 1 based on a blacklist acquisition request from the user terminal 1. The updating unit 33 updates the blacklist 30 stored in the storage unit 31 to provide a latest blacklist.

The login information server 4 is a computer and includes a login information list storage unit (hereinafter referred to as a storage unit) 41, a login information list transmitter unit (hereinafter referred to as a transmitter unit) 42, and a login information list updating unit (hereinafter referred to as an updating unit) 43. In the storage unit 41, a plurality of login information lists 40 (only one of the lists 40 is shown in the figure) respectively corresponding to the plurality of user terminals 1 is stored. Each of the plurality of user terminals 1 retains the user identification information identifying itself. As described above, one user terminal 1 of the user terminals 1 retains "U001" as the user identification information. The login information lists 40 includes a login information list corresponding to the user terminal 1 "U001", in which login history information is registered as shown in FIG. 4. The login history information includes the user identification information "U001". In addition, the login history information includes a login information number for identifying itself, the authentication information, a browsed URL identifying the target web page 70 which was displayed on the display unit 12 when the input authentication information 81 was inputted before. In addition, a user of the user terminal 1 "U001" may create the login history information by using the input unit 11, and may register the created information to the login information list 40 "U001". The login information list 40 "U001" will be described in detail below.

The transmitter unit 42 receives a login information list request from the user terminal 1. The login information list request includes the user identification information "U001". The transmitter unit 42 selects, from the login information lists 40 stored in the storage unit 41, the login information list 40 including the user identification information which agrees with the user identification information "U001" in the login information list request and transmits the selected list as the login information list 40 for the user terminal 1 to the user terminal 1. The updating unit 43 receives a login information list updating request from the user terminal 1. The login information list updating request includes the login history information and the user identification information "U001". The updating unit 43 selects, from the login information lists 40 stored in the storage unit 41, the login information list 40 including the user identification information which agrees with the user identification information "U001" in the login information list updating request and registers the login history information included in the login information list updating request to the selected login information list 40 "U001". In this way, the login information list 40 "U001" is updated.

The service group information server 5 includes a service group information list storage unit (hereinafter referred to as a storage unit) 51, a service group information list transmitter unit (hereinafter referred to as a transmitter unit) 52, and a service group information list updating unit (hereinafter referred to as an updating unit) 53. In the storage unit 51, the service group information list 50 is stored. As shown in FIG. 5, service groups are registered in the service group information list 50. Each of the service groups includes service URLs respectively identifying web pages which allow an authentication by using common authentication information. The service group information list 50 will be described in detail below.

The transmitter unit 52 transmits a copy of the service group information list 50 stored in the storage unit 51 to the user terminal 1 based on a service group information list acquisition request from the user terminal 1. The updating unit 53 updates the service group information list 50 stored in the storage unit 51 to provide a latest service group information list.

[Operation]

Figure 6:
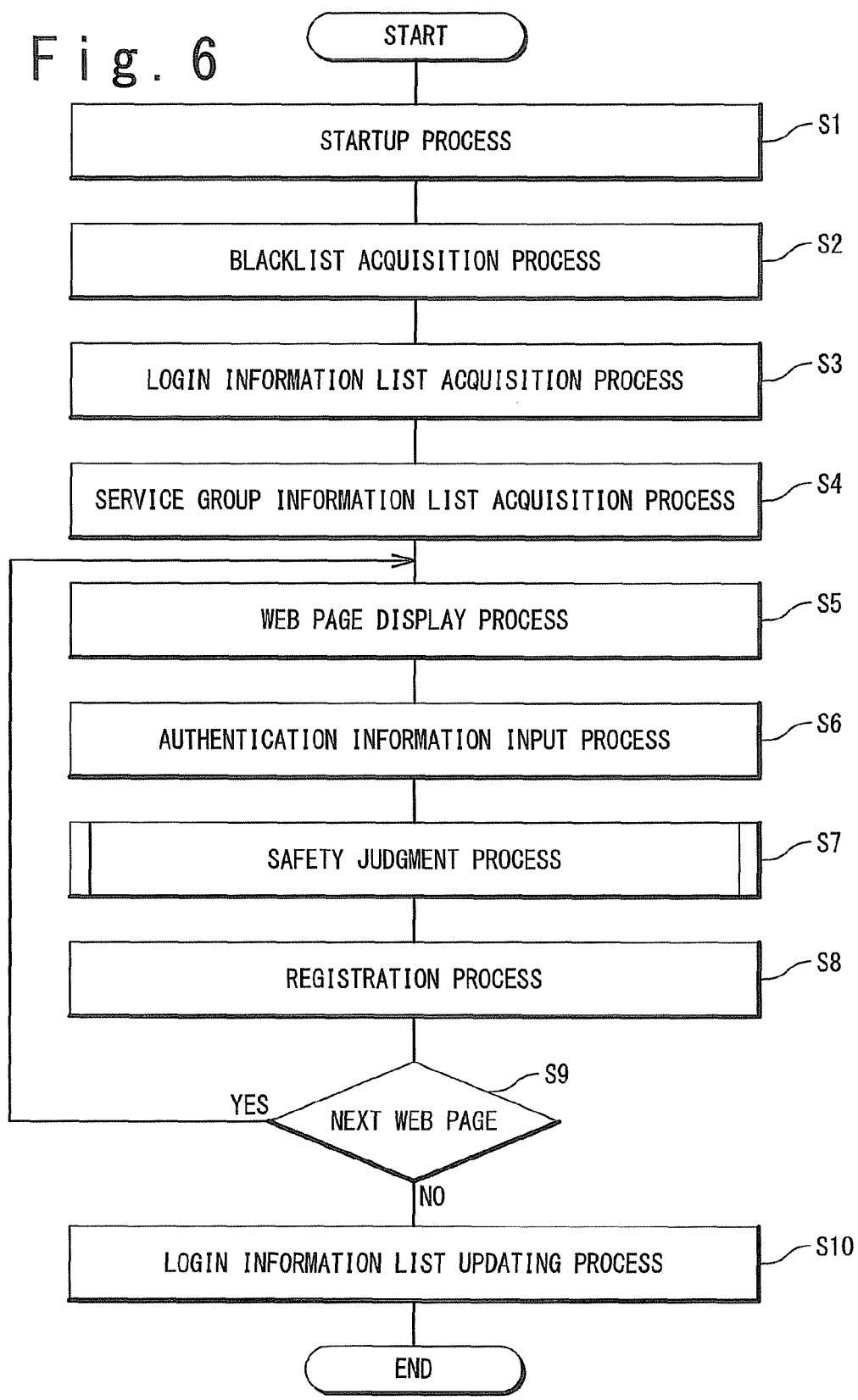
FIG. 6 is a flowchart illustrating an operation of the web page safety judgment system of the present invention.
Figure 7:
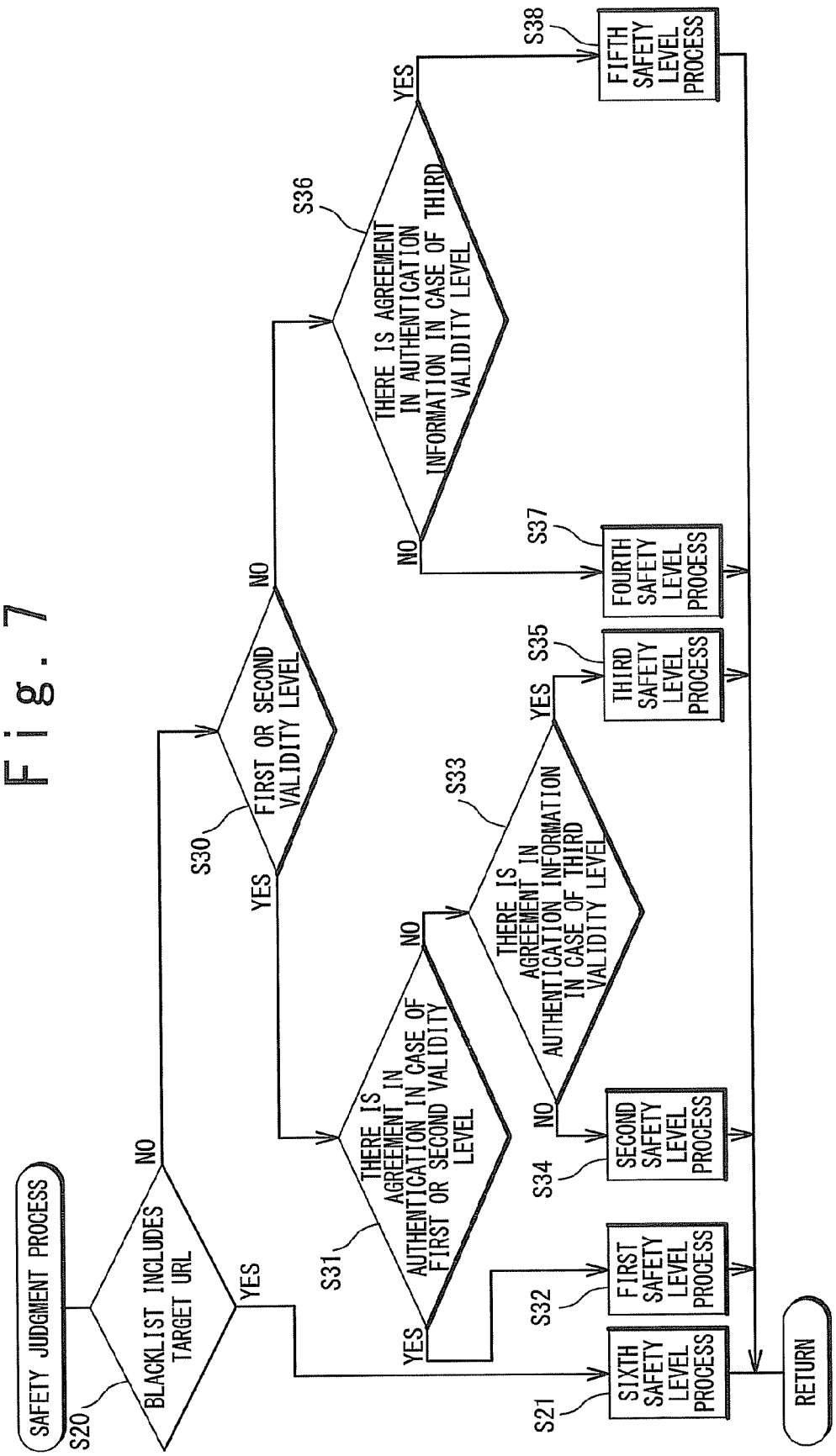
FIG. 7 is a flowchart illustrating safety judgment process (step S7) in FIG. 6.

FIGS. 6 and 7 are flowcharts showing an operation of the web page safety judgment system according to the first exemplary embodiment of the present invention.

At first, the user terminal 1 is started up, and the computer program 20 installed in the user terminal 1 is started up (step S1; startup process).

At this time, the blacklist acquisition process part 21-0 of the user terminal 1, in order to acquire the blacklist 30, transmits a blacklist acquisition request to the blacklist server 3. The transmitter unit 32 of the blacklist server 3 transmits a copy of the blacklist 30 stored in the storage unit 31 to the user terminal 1 based on the blacklist acquisition request. The blacklist acquisition process part 21-0 stores the blacklist 30 from the blacklist server 3 in the storage unit 13 (step S2; blacklist acquisition process).

The login information list acquisition process part 21-1 of the user terminal 1, in order to acquire the login information list 40, transmits a login information list acquisition request including the user identification information "U001" to the login information server 4. The transmitter unit 42 of the login information server 4 selects, from the login information lists 40 stored in the storage unit 41, the login information list 40 including the user identification information which agrees with the user identification information "U001" in the login information list acquisition request and transmits the selected list as the login information list 40 for the user terminal 1 to the user terminal 1. The login information list acquisition process part 21-1 stores the login information list 40 from the login information server 4 in the storage unit 13 (step S3; login information list acquisition process).

In step S3, there is a case that no login history information exists in the login information list 40 corresponding to the user identification information "U001". The case will be explained.

In this case, the login information server 4 transmits a login information request error to the user terminal 1. The login information request error indicates that no login history information exists in the login information list 40 "U001".

When the login information list acquisition process part 21-1 receives the login information request error, steps S4 to S6 are executed, step S7 is skipped, and steps S8 and S10 are executed. Steps S4 to S8 and S10 will be described later.

In step S6, the login information list acquisition process part 21-1 displays a new access guidance indicator on the display unit 12. The new access guidance indicator indicates notification requiring a user to input the authentication information (an ID, and a password) by using the input unit 11 into the authentication information input field 71 of the target web page 70 displayed on the display unit 12 and to press the transmission button 72 in the target web page 70.

When the authentication information is inputted into the authentication information input field 71 and the transmission button 72 is pressed, the history registration process part 25 displays a new access registration indicator on the display unit 12 at step S8. The new access registration indicator includes a notification of registering the above mentioned authentication information to the login information list "U001", a "Yes" button to register the information, and a "No" button not to register the information. When the "Yes" button is pressed, login history information is generated which includes the above mentioned authentication information and a browsed URL as the target URL. The history registration process part 25 registers the login history information to the login information list 40 "U001".

At step S10, the login information list updating process part 21-2 transmits a login information list updating request to the login information server 4 in order to update the login history information registered in the login information list 40. The login information list updating request includes the login history information generated by the history registration process part 25 and the user identification information "U001". The updating unit 43 of the login information server 4 selects, from the login information lists 40 stored in the storage unit 40, the login information list 40 including the user identification information which agrees with the user identification information "U001" in the login information list updating request, and registers the login history information included in the login information list updating request to the selected login information list 40 "U001". That is, the login information list 40 "U001" is updated.

Next, a case that login history information exists in the login information list 40 corresponding to the user identification information "U001" at step S3 will be explained below.

The service group information list acquisition process part 21-3 of the user terminal 1 transmits a service group information list acquisition request to the service group information server 5 in order to acquire the service group information list 50. The transmitter unit 52 transmits a copy of the service group information list 50 stored in the storage unit 51 to the user terminal 1 based on the service group information list acquisition request. The service group information list acquisition process part 21-3 stores the service group information list 50 from the service group information server 5 in the storage unit 13 (step S4; service group information list acquisition process). In the present exemplary embodiment, steps S3 and S4 may be simultaneously executed and may be executed in the reverse order.

A user of the user terminal 1 issues an instruction to display, on the display unit 12, an arbitrary web page among web pages published on the network 2 by using the input unit 11. The arbitrary webpage is the above mentioned target web page 70 here. In this case, the browser process part 22 displays, on the display unit 12 of the user terminal 1, the target web page 70 published on the network 2 based on the instruction (step S5; web page display process).

Here, the above described steps S2 to S4 may be executed after step S5. In this case, the above described steps S2 to S4 are executed every time the target web page 70 is displayed on the display unit 12 of the user terminal 1.

The user of the user terminal 1 inputs, for the purpose of receiving a predetermined service, the input authentication information 81 as authentication information into the authentication information input field 71 of the target web page 70 displayed on the display unit 12 by using the input unit 11 (step S6; authentication information input process).

At step S6, when the user presses the transmission button 72 in the target web page 70 displayed on the display unit 12, the input authentication information 81 inputted into the authentication information input field 71 is not transmitted immediately but transmitted after execution of safety judgment process described below. In this case, the input process part 26 retains the input authentication information 81 inputted into the authentication information input field 71 and waits for a transmission execution instruction or a transmission execution canceling instruction from the safety process part 24.

In the present invention, for example, the input process part 26 executes the retaining and the waiting when detecting the pressing of the transmission button 72. The process part 26 may executes the retaining and the waiting when detecting a HTTP (Hyper Text Transfer Protocol) request message for transmitting the input authentication information 81 to the service providing web server 6. For example, in a case of authentication such as basic authentication, for which an authentication dialogue appears, a method is employed in which the input process part 26 executes the retaining and the waiting based on "detection of the pressing of the transmission button". In a case of normal authentication from a web page, a method is employed in which the input process part 26 executes the retaining and the waiting based on "detection of the HTTP request message". In the case of employing the method which uses "detection of the HTTP request message", the HTTP request message is monitored, the message is analyzed to be a message for transmitting authentication information or not, and the input authentication information is detected.

The user terminal 1 performs the safety judgment process (step S7).

At first, the blacklist judgment process part 23-0 of the user terminal 1 refers to the blacklist 30 to judge whether or not a target URL of the target webpage 70 displayed on the display unit 12 agrees with the harmful URL (step S20).

When the target URL of the target web page 70 displayed on the display unit 12 agrees with the harmful URL (YES at step S20), the safety process part 24 of the user terminal 1 executes a sixth safety level process (step S21). In the present invention, steps S20 and S21 are not necessarily executed in this order. Step S20 may be executed immediately after the web page display process (step S5) and the sixth safety level process (step S21) may be executed when the authentication information input process (step S6) is executed.

As the sixth safety level process (step S21), the safety process part 24 outputs the transmission execution canceling instruction to cancel the transmission of the transmission authentication information. In this case, the input process part 26 discards the input authentication information 81 retained by the input process part 26 based on the transmission execution canceling instruction. At this time, the safety process part 24 displays, on the display unit 12, a cancellation notice showing that the target URL of the target web page 70 agrees with the harmful URL.

On the other hand, when the target URL of the target web page 70 displayed on the display unit 12 does not agree with any harmful URL (NO in step S20), the first validity judgment process part 23-1, the second validity judgment process part 23-2, and the third validity judgment process part 23-3 of the user terminal 1 judge first to third validity levels described below with respect to the login history information registered in the login information list 40, respectively (step S30). In addition, the safety process part 24 judges whether or not the input authentication information 81 agrees with the authentication information of the login history information registered in the login information list 40.

In step S30, the first validity judgment process part 23-1 of the user terminal 1 refers to the login information list 40 to check the browsed URL registered in the login information list 40 with the target URL identifying the target web page 70 displayed on the display unit 12. Then, the first validity judgment process part 23-1 judges that the login history information registered in the login information list 40 and including the browsed URL which agrees with the target URL is the first validity level.

In step S30, the second validity judgment process part 23-2 of the user terminal 1 refers to the login information list 40 and the service group information list 50 to select, from the service groups registered in the service group information list 50, first service groups. Each of the first service groups includes a service URL which agrees with the browsed URL registered in the login information list 40. Next, the second validity judgment process part 23-2 checks service URLs of each first service group with the target URL to select a second service group from the first service groups. The second service group includes a service URL which agrees with the target URL. Then, the second validity judgment process part 23-2 judges that the login history information registered in the login information list 40 and including the browsed URL which agrees with the service URL of the second service group is the second validity level.

In step S30, the third validity judgment process part 23-3 of the user terminal 1 refers to the login information list 40 and the service group information list 50 to judge that the login history information other than the login history information of the first or second validity level and registered in the login information list 40 is the third validity level.

Here, in the present invention, the judgments of the first and second validity levels are performed based on a validity judgment rule in which one URL is judged to agree with another URL when the one entirely agrees with the other, when the one agrees with the other in other than a query portion, when the one agrees with the other in a host FQDN (Fully Qualified Domain Name) level, or when the one agrees with the other in a domain level.

In step S30, the safety process part 24 of the user terminal 1 checks the input authentication information 81 retained by the input process part 26 with the authentication information of the login history information in the first to third validity levels, and generates a check result. According to this, the safety process part 24 selects a corresponding process from a plurality of predetermined processes for the input authentication information 81 based on existence or absence of the login history information in the first or second validity level and on the above mentioned check result, and executes the selected process. Here, when it is judged to be safe to transmit the input authentication information 81 for the target web page 70, in the corresponding process, the input authentication information 81 is transmitted as the transmission authentication information. On the other hand, when it is judged to be risky to transmit the input authentication information 81 for the target web page 70, the transmission of the transmission authentication information is canceled. These will be explained below.

When the login history information in the first validity level exists, the input authentication information 81 retained by the input process part 26 agrees with the authentication information of the login history information in the first validity level (YES at step S30 and YES at step S31). This case means that the target web page 70 was displayed on the display unit 12 when the input authentication information 81 was inputted before and the input authentication information 81 is already known. In this case, the safety process part 24 of the user terminal 1 executes a first safety level process as the corresponding process (step S32).

In the first safety level process (step S32), the safety process part 24 outputs the transmission execution instruction. In this case, the input process part 26 transmits the input authentication information 81 retained by the input process part 26 as the transmission authentication information based on the transmission execution instruction.

When the login history information in the second validity level exists, the input authentication information 81 retained by the input process part 26 agrees with the authentication information of the login history information in the second validity level (YES at step S30 and YES at step S31). This means that a web page of a service related to the target web page 70 was displayed on the display unit 12 when the input authentication information 81 was inputted before and the input authentication information 81 is already known. In this case, the safety process part 24 of the user terminal 1 executes the first safety level process as the corresponding process (step S32).

When the login history information in the first or second validity level exists, the input authentication information 81 retained by the input process part 26 does not agree with the authentication information of the login history information (YES at step S30 and YES at step S31). This means that, since the target web page 70 or the web page of the service related to the target web page 70 was displayed on the display unit 12 when the input authentication information 81 was inputted before, the input authentication information 81 is changed with respect to the authentication information of the login history information in the first or second validity level. In this case, the safety process part 24 of the user terminal 1 executes second safety level process as the above corresponding process (step S34).

In the second safety level process (step S34), the safety process part 24 outputs the transmission execution instruction. In this case, the input process part 26 transmits the input authentication information 81 retained by the input process part 26 as the transmission authentication information based on the transmission execution instruction. At this time, the safety process part 24 displays a change confirmation notice on the display unit 12. The change confirmation notice indicates that, since the target web page 70 or the web page of the service related to the target webpage 70 was displayed on the display unit 12 when the input authentication information 81 was inputted before, the input authentication information 81 is changed with respect to the authentication information of the login history information in the first or second validity level.

When the login history information in the first or second validity level exists, the input authentication information 81 retained by the input process part 26 does not agree with the authentication information of the login history information in the first or second validity level but the input authentication information 81 agrees with the authentication information of the login history information in the third validity level (YES at step S30, NO at step S31, and YES at step S33). This means that, since the target web page 70 or the web page of the service related to the target web page 70 was displayed on the display unit 12 when the input authentication information 81 was inputted before, the input authentication information 81 is an incorrect input. In this case, the safety process part 24 of the user terminal 1 executes a third safety level process as the above corresponding process (step S35).

In the third safety level process (step S35), the safety process part 24 displays an incorrect input selection indicator on the display unit 12. This incorrect input selection indicator includes an incorrect input selection field in which the user of the user terminal 1 selects, by using the input unit 11, whether or not the input authentication information 81 inputted into the authentication information input field 71 is transmitted.

In addition, the safety process part 24 displays an incorrect input notice on the display unit 12. The incorrect input notice indicates that, since the target web page 70 or the web page of the service related to the target web page 70 was displayed on the display unit 12 when the input authentication information 81 was inputted before, the input authentication information 81 is an incorrect input.

When the transmission of the input authentication information 81 is selected in the incorrect input selection field, the safety process part 24 outputs the transmission execution instruction. In this case, the input process part 26 transmits the input authentication information 81 retained by the input process part 26 as the transmission authentication information based on the transmission execution instruction.

On the other hand, when cancellation of the transmission of the input authentication information 81 is selected in the incorrect input selection field, the safety process part 24 cancels transmission of the transmission authentication information, and outputs the transmission execution canceling instruction. In this case, the input process part 26 discards the input authentication information 81 retained by the input process part 26 based on the transmission execution canceling instruction.

When the login history information in the first and second validity levels do not exist and the login history information in the third validity level exists, the input authentication information 81 retained by the input process part 26 does not agree with the authentication information of the login history information in the third validity level (NO at step S30 and NO at step S36). This means that the target web page 70 or the web page of the service related to the target web page 70 was not displayed on the display unit 12 when the input authentication information 81 was inputted before and that the input authentication information 81 is new authentication information. In this case, the safety process part 24 of the user terminal 1 executes a fourth safety level process as the above described corresponding process (step S37).

In the fourth safety level process (step S37), the safety process part 24 displays a new input selection indicator on the display unit 12. The new input selection indicator includes a new input selection field in which the user of the user terminal 1 selects, by using the input unit 11, whether or not the input authentication information 81 inputted into the authentication information input field 71 is transmitted.

In addition, the safety process part 24 displays a new input notice on the display unit 12. The new input notice indicates that the target web page 70 or the web page of the service related to the target web page 70 was not displayed on the display unit 12 when the input authentication information 81 was inputted before and that the input authentication information 81 is new authentication information.

On that basis, when the transmission of the input authentication information 81 is selected in the new input selection field, the safety process part 24 outputs the transmission execution instruction. In this case, the input process part 26 transmits the input authentication information 81 retained by the input process part 26 as the transmission authentication information based on the transmission execution instruction.

On the other hand, when cancellation of the transmission of the input authentication information 81 is selected in the new input selection field, the safety process part 24 cancels the transmission of the transmission authentication information, and outputs the transmission execution canceling instruction. In this case, the input process part 26 discards the input authentication information 81 retained by the input process part 26 based on the transmission execution canceling instruction.

When the login history information in the first and second validity levels do not exist and the login history information in the third validity level exists, the input authentication information 81 retained in the input process part 26 agrees with the authentication information of the login history information in the third validity level (NO at step S30 and YES at step S36). This means that the target web page 70 or the web page of the service related to the target web page 70 was not displayed on the display unit 12 when the input authentication information 81 was inputted before and that the input authentication information 81 is already known but does not correspond to the target URL (phishing). In this case, the safety process part 24 of the user terminal 1 executes a fifth safety level process as the above corresponding process (step S38).

In the fifth safety level process (step S38), the safety process part 24 cancels the transmission of the transmission authentication information, and outputs the transmission execution canceling instruction. In this case, the input process part 26 discards the input authentication information 81 retained by the input process part 26 based on the transmission execution canceling instruction. At this time, the safety process part 24 displays a cancellation notice on the display unit 12. The cancellation notice indicates that the target web page 70 or the web page of the service related to the target web page 70 was not displayed on the display unit 12 when the input authentication information 81 was inputted before and that the input authentication information 81 is already known but does not correspond to the target URL.

When the transmission authentication information is transmitted as a result of execution of the above safety judgment process (step S7), the history registration process part 25 of the user terminal 1 generates (or updates) the login history information including authentication information corresponding to the transmission authentication information and browsed URL corresponding to the target URL. The history registration process part 25 registers this login history information to the login information list 40 (step S8; registration process).

At step S8, when generating the login history information, the history registration process part 25, at the timing when a web page next to the target web page 70 is displayed on the display unit 12, displays an indicator for confirming whether or not the target URL of the target web page 70 is to be added. In the case of the addition, the history registration process part 25 generates login history information for the target URL and registers the information to the login information list 40.

When the login history information in the first validity level exists (YES at step S30), the input authentication information 81 retained by the input process part 26 agrees with the authentication information of the login history information in the first validity level (YES at step S31), and the first safety level process is executed (step S32), the same URL, as the browsed URL of the login history information in the first validity level, has been already registered to the login information list 40. For this reason, the history registration process part 25 is not required to execute step S8.

When the login history information in the second validity level exists (YES at step S30), the input authentication information 81 retained by the input process part 26 agrees with the authentication information of the login history information in the second validity level (YES at step S31), and the first safety level process (step S32) is executed, the history registration process part 25 updates the login history information at step S8. In this case, the history registration process part 25 adds the target URL to the browsed URLs of the login history information in the first validity level and registers it to the login information list 40.

When the second safety level process (step S34) is executed, the history registration process part 25 generates the login history information at step S8. In this case, the history registration process part 25 deletes the login history information (the authentication information and the browsed URL) in the above mentioned validity level, and registers, to the login information list 40, new login history information including the authentication information corresponding to the transmission authentication information (the input authentication information 81) and browsed URL corresponding to the target URL.

When the third safety level process (step S35) is executed, the history registration process part 25 generates the login history information at step S8. In this case, the history registration process part 25 registers, to the login information list 40, new login history information including authentication information corresponding to the transmission authentication information (the input authentication information 81) and browsed URL corresponding to the target URL.

When the fourth safety level process (step S37) is executed, the history registration process part 25 generates the login history information at step S8. In this case, the history registration process part 25 registers, to the login information list 40, new login history information including authentication information corresponding to the transmission authentication information (the input authentication information 81) and browsed URL corresponding to the target URL.

When a next web page is displayed after the display of the target webpage 70 (YES at step S9), the above processes after step S5 are executed.

On the other hand, when finishing the display of the target web page 70 and ending the execution of the computer program 20, the user of the user terminal 1 issues instructions by using the input unit 11 (NO at step S9). In this case, the login information list updating process part 21-2 of the user terminal 1, in order to causes the login information server 4 to update the login history information registered in the login information list 40, transmits a login information list updating request including the login history information generated by the history registration process part 25 and the user identification information "U001" to the login information server 4. The updating unit 43 of the login information server 4 selects, from the login information lists 40 stored in the storage unit 41, the login information list 40 including the user identification information which agrees with the user identification information "U001" in the login information list updating request and registers the login history information included in the login information list updating request to the selected login information list 40 "U001". In this way, the login information list 40 "U001" is updated (step S10).

Here, the process at step S10 is not necessarily executed at the time of ending the execution of the computer program 20, and may be executed every time the above safety judgment process (step S7) and the registration process (step S8) are executed.

[Effect]

As described above, according to the web page safety judgment system according to the first exemplary embodiment of the present invention, the user terminal 1 can secure, by executing the above described safety judgment process (step S7), a higher safety of the authentication information in compared with the judgment using the blacklist 30, in which no hit may occur. Specifically, the web page safety judgment system executes judgments with respect to the above described first to third validity levels by referring to the login information list 40 and the service group information list 50, and generates a check result by checking the input authentication information 81 with the authentication information of the login history information in the first to third validity levels. Then, the web page safety judgment system selects a corresponding process from a plurality of predetermined processes for the input authentication information 81 based on existence or absence of the login history information in the first or second validity level and on the above mentioned check result, and executes the selected process. Here, when it is judged to be safe to transmit the input authentication information 81 for the target web page 70, the input authentication information 81 is transmitted as the transmission authentication information in the corresponding process. And, when it is judged to be risky to transmit the input authentication information 81 for the target webpage 70, the transmission of the transmission authentication information is canceled in the corresponding process. According to this, a higher safety of the authentication information can be secured in compared with the judgment using the blacklist 30, in which no hit may occur. In addition, a higher safety of the authentication information can be secured in compared with the judgment using a whitelist, since it is difficult to judge whether a third party providing the whitelist is truly trustworthy and there is a limitation in checking innumerable number of web pages.

Moreover, according to the web page safety judgment system according to the first exemplary embodiment of the present invention, the user terminal 1 executes the judgment based on the blacklist 30, after that, executes judgments with respect to the above described first to third validity levels, and checks the input authentication information 81 with the authentication information of the login history information in the first to third validity levels. Accordingly, the safety of the authentication information can be doubly secured.

Furthermore, according to the web page safety judgment system according to the first exemplary embodiment of the present invention, in the above described predetermined process, in addition to an execution result of the safety level process (the first to sixth safety level process), the change confirmation notice, the incorrect input notice, the new input notice, the cancellation notice, and the like are displayed on the display unit 12 depending on a type of the safety level process. For this reason, a user can know which safety level process was executed.

According to the present exemplary embodiment, the above described predetermined processes are not limited to the six types of the safety level process (the first to sixth safety level process) but may be other processes.

(Second Exemplary Embodiment)

Next, a web page safety judgment system according to a second exemplary embodiment of the present invention will be explained. As for the second exemplary embodiment, the same explanation will be omitted by assigning the same numerals to the same components as those of the first exemplary embodiment.

Figure 8:
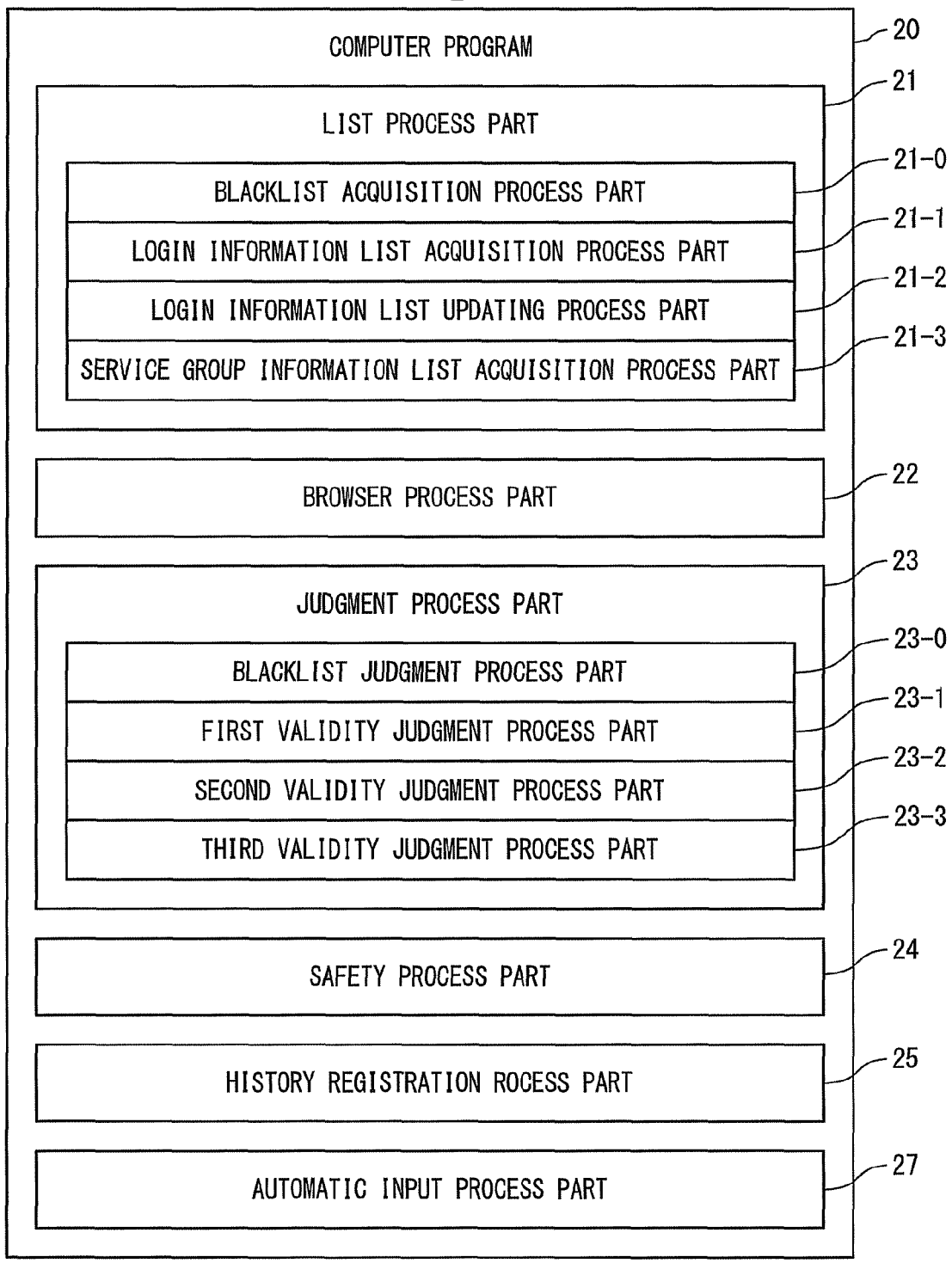
FIG. 8 shows a computer program 20 installed in the user terminal 1 of the web page safety judgment system according to the second exemplary embodiment of the present invention.

A user of the user terminal 1 may forget the authentication information corresponding to the target web page 70. In this case, the user can use an automatic input function in the authentication information input process (step S6). As shown in FIG. 8, the computer program 20 of the user terminal 1 includes, instead of the input process part 26, an automatic input process part 27 having an automatic input function.

At step S6, the automatic input process part 27 detects the authentication information input field 71 in the target web page 70 displayed on the display unit 12. This automatic input process part 27 retains candidate authentication information as the input authentication information 81.

Here, the candidate authentication information is registered in the storage unit 13 in advance. For example, since the login information list 40 is registered in the storage unit 13, the candidate authentication information may be the authentication information of the login history information registered to the login information list 40. In addition, when the automatic input process part 27 registered, in the storage unit 13, the input authentication information which was inputted into the authentication information input field 71 before, the candidate authentication information may be the input authentication information which was registered in the storage unit 13 at that time. When the user of the user terminal 1 inputted the authentication information and registered the information in the storage unit 13 by using the input unit 11, the candidate authentication information may be the authentication information registered in the storage unit 13 at that time. This candidate authentication information is registered with at least one identifier for identifying the authentication information input field 71 of the target web page 70. For example, the identifier is the target web page 70, a URL to which the transmission authentication information is transmitted, or a screen image. When detecting the authentication information input field 71, the automatic input process part 27 reads the candidate authentication information from the storage unit 13 based on the target web page 70 or the screen image displayed on the display unit 12, a transmission URL described by data of the target web page 70, selection by the input unit 11, or the like, and retains the candidate authentication information as the input authentication information 81. By the way, an automatic input method may be realized by a method different from the process executed by the automatic input process part 27.

After that, the automatic input process part 27 waits for an input execution instruction or an input execution canceling instruction from the safety process part 24.

When judging it is safe to input the input authentication information 81 in the target web page 70, the safety process part 24 outputs the input execution instruction in place of the above mentioned transmission execution instruction. On the other hand, when judging it is risky to input the input authentication information 81 in the target web page 70, the safety process part 24 outputs the input execution canceling instruction in place of the transmission execution canceling instruction.

At step S30 in the safety judgment process (step S7) the first to third validity judgment process parts 23-1 to 23-3 judge the first to third validity levels with respect to the login history information registered in the login information list 40, respectively, and the safety process part 24 generates a check result by checking the input authentication information 81 retained by the automatic input process part 27 with the authentication information of the login history information in the first to third validity levels. The safety process part 24 selects a corresponding process from a plurality of predetermined processes for the input authentication information 81 based on existence or absence of the login history information in the first or second validity level and on the above mentioned check result, and executes the selected process.

When the login history information in the first validity level exists, the input authentication information 81 retained by the automatic input process part 27 agrees with the authentication information of the login history information in the first validity level (YES at step S30 and YES at step S31). This means that the target web page 70 was displayed on the display unit 12 when the input authentication information 81 was inputted before and the input authentication information 81 is already known.

Or, when the login history information in the second validity level exists, the input authentication information 81 retained by the automatic input process part 27 agrees with the authentication information of the login history information in the second validity level (YES at step S30 and YES at step S31). This means that a web page of a service related to the target web page 70 was displayed on the display unit 12 when the input authentication information 81 was inputted before and the input authentication information 81 is already known.

In these cases, the safety process part 24 outputs the input execution instruction in the first safety level process (step S32). The automatic input process part 27 inputs the input authentication information 81 retained by the automatic input process part 27 into the authentication information input field 71 based on the input execution instruction.

When the login history information in the first or second validity level exists, the input authentication information 81 retained by the automatic input process part 27 does not agree with all the authentication information of the login history information (YES at step S30, NO at step S31, and NO at step S33). This means that, since the target web page 70 or the web page of the service related to the target web page 70 was displayed on the display unit 12 when the input authentication information 81 was inputted before, the input authentication information 81 is changed with respect to the authentication information of the login history information in the first or second validity level. In this case, the safety process part 24 outputs the input execution instruction in the second safety level process (step S34). The automatic input process part 27 inputs the input authentication information 81 retained by the automatic input process part 27 into the authentication information input field 71 based on the input execution instruction. At that time, the safety process part 24 displays the above mentioned change confirmation notice on the display unit 12.

When the login history information in the first or second validity level exists, the input authentication information 81 retained in the automatic input process part 27 does not agree with the authentication information of the login history information in the first or second validity level but the input authentication information 81 agrees with the authentication information of the login history information in the third validity level (YES at step S30, NO at step S31, and YES at step S33). This means that, since the target web page 70 or the web page of the service related to the target web page 70 was displayed on the display unit 12 when the input authentication information 81 was inputted before, the input authentication information 81 is incorrect. In this case, the safety process part 24 displays an input yes-or-no selection indicator on the display unit 12 in the third safety level process (step S35). This input yes-or-no selection indicator includes an input yes-or-no selection field in which the user of the user terminal 1 selects, by using the input unit 11, whether or not the input authentication information is inputted into the authentication information input field 71.

In addition, the safety process part 24 displays the above mentioned incorrect input notice on the display unit 12.

When the input of the input authentication information is selected in the input yes-or-no selection field, the safety process part 24 outputs the input execution instruction. In this case, the automatic input process part 27 inputs the input authentication information 81 having been retained by the automatic input process part 27 into the authentication information input field 71 based on the input execution instruction.

On the other hand, when cancellation of the input of the input authentication information is selected in the input yes-or-no selection field, the safety process part 24 outputs the input execution canceling instruction. In this case, the automatic input process part 27 cancels the input of the input authentication information 81 retained by the automatic input process part 27 into the authentication information input field 71 based on the input execution canceling instruction.

When the login history information in the first and second validity levels do not exist and the login history information in the third validity level exists, the input authentication information 81 retained by the automatic input process part 27 does not agree with the authentication information of the login history information in the third validity level (NO at step S30 and NO at step S36). This means that the target web page 70 or the web page of the service related to the target web page 70 was not displayed on the display unit 12 when the input authentication information 81 was inputted before and that the input authentication information 81 is new authentication information. In this case, the safety process part 24 displays, on the display unit 12, the above mentioned input yes-or-no selection indicator including the input yes-or-no field in stead of the above mentioned new input selection indicator including the new input selection field in the fourth safety level process (step S37).

In addition, the safety process part 24 displays the above mentioned new input notice on the display unit 12.

When the input of the input authentication information is selected in the input yes-or-no selection field, the safety process part 24 outputs the input execution instruction. In this case, the automatic input process part 27 inputs the input authentication information 81 retained by the automatic input process part 27 into the authentication information input field 71 based on the input execution instruction.

On the other hand, when cancellation of the input of the input authentication information is selected in the input yes-or-no selection field, the safety process part 24 outputs the input execution canceling instruction. In this case, the automatic input process part 27 cancels the input of the input authentication information 81 retained by the automatic input process part 27 into the authentication information input field 71 based on the input execution canceling instruction.

When the login history information in the first and second validity levels do not exist and the login history information in the third validity level exists, the input authentication information 81 retained in the automatic input process part 27 agrees with the authentication information of the login history information in the third validity level (NO at step S30 and YES at step S36). This means that the target web page 70 or the web page of the service related to the target web page 70 was not displayed on the display unit 12 when the input authentication information 81 was inputted before and that the input authentication information 81 is already known but does not correspond to the target URL. In this case, the safety process part 24 outputs the input execution canceling instruction in the fifth safety level process (step S38). In this case, the automatic input process part 27 cancels the input of the input authentication information 81 retained by the automatic input process part 27 into the authentication information input field 71 based on the input execution canceling instruction.

(Third Exemplary Embodiment)

Next, a web page safety judgment system according to a third exemplary embodiment of the present invention will be explained. As for the third exemplary embodiment, the same explanation will be omitted by assigning the same numerals to the same components as those of the second exemplary embodiment.

Figure 9:
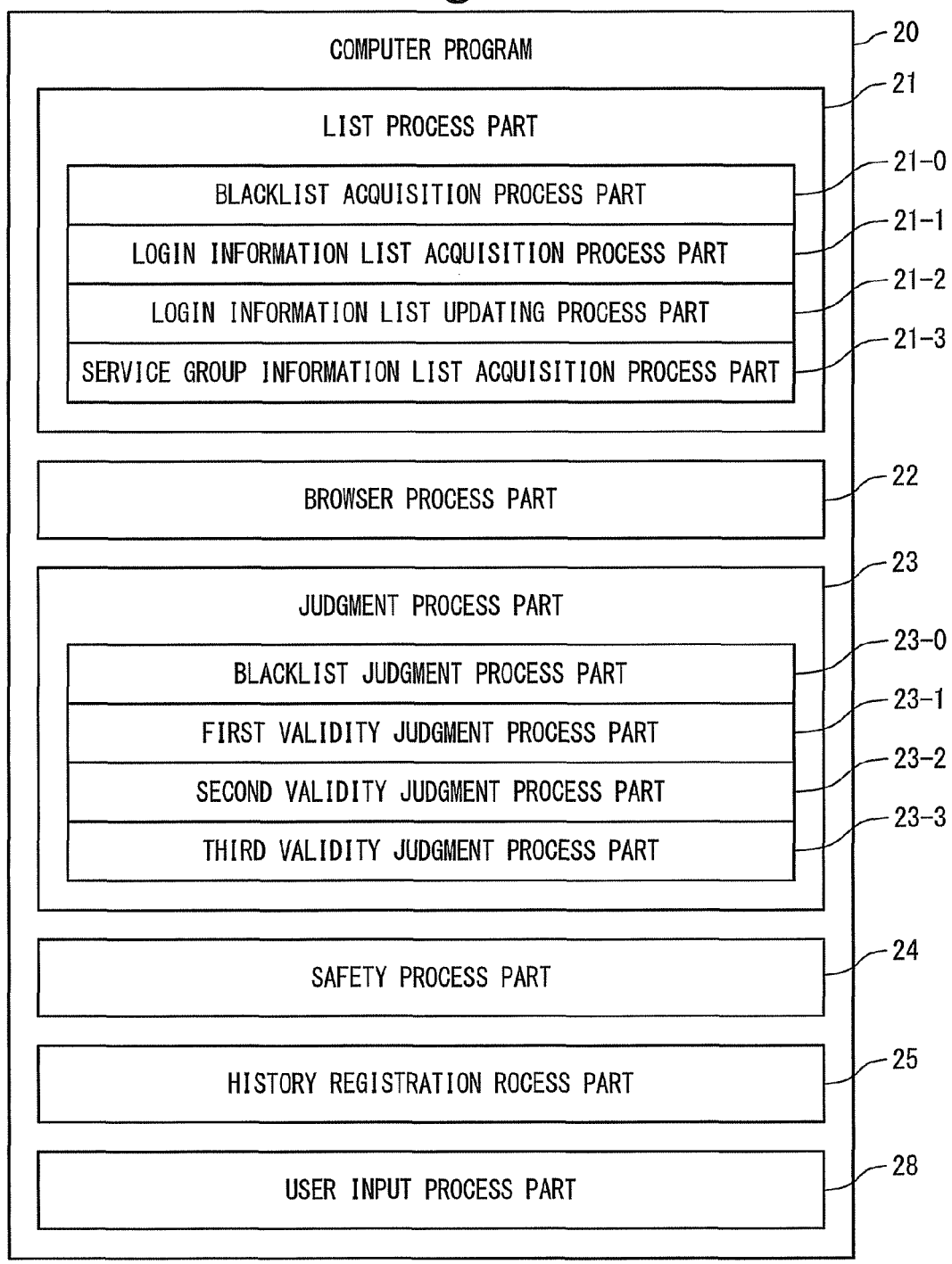
FIG. 9 shows a computer program 20 installed in the user terminal 1 of the web page safety judgment system according to the third exemplary embodiment of the present invention.

The user of the user terminal 1 may forget the authentication information corresponding to the target web page 70. In this case, the user can use an input function for allowing the user to select the authentication information in the authentication information input process (step S6). As shown in FIG. 9, the computer program 20 of the user terminal 1 includes, instead of the input process part 26 and the automatic input process part 27, a user input process part 28 having an input function.

At step S6, the user input process part 28 detects the authentication information input field 71 of the target web page 70 displayed on the display unit 12. At this time, the user input process part 28 displays a provisional input indicator on the display unit 12. This provisional input indicator includes an authentication information input field into which the user of the user terminal 1 can input the authentication information by using the input unit 11. This authentication information input field is other than the authentication information input field 71. Hereinafter, the authentication information input field of the provisional input indicator is referred to as other authentication information input field. The user input process part 28 retains the authentication information inputted by the user of the user terminal 1 into the other authentication information input field, and waits for the input execution instruction or the input execution canceling instruction from the safety process part 24.

When judging it is safe to input the input authentication information 81 in the target web page 70, the safety process part 24 outputs the input execution instruction in place of the above mentioned transmission execution instruction. On the other hand, when judging it is risky to input the input authentication information 81 in the target web page 70, the safety process part 24 outputs the input execution canceling instruction in place of the transmission execution canceling instruction.

At step S30 in the safety judgment process (step S7) the first to third validity judgment process parts 23-1 to 23-3 judge the first to third validity levels with respect to the login history information registered by the login information list 40, respectively, and the safety process part 24 generates a check result by checking the input authentication information 81 retained in the user input process part 28 with the authentication information of the login history information in the first to third validity levels. The safety process part 24 selects a corresponding process from a plurality of predetermined processes for the input authentication information 81 based on existence or absence of the login history information in the first or second validity level and on the above mentioned check result, and executes the selected process.

When the login history information in the first validity level exists, the input authentication information 81 retained by the user input process part 28 agrees with the authentication information of the login history information in the first validity level (YES at step S30 and YES at step S31). This means that the target web page 70 was displayed on the display unit 12 when the input authentication information 81 was inputted before and the input authentication information 81 is already known.

Or, when the login history information in the second validity level exists, the input authentication information 81 retained by the user input process part 28 agrees with the authentication information of the login history information in the second validity level (YES at step S30 and YES at step S31). This means that a web page of a service related to the target web page 70 was displayed on the display unit 12 when the input authentication information 81 was inputted before and the input authentication information 81 is already known.

In these cases, the safety process part 24 outputs the input execution instruction in the first safety level process (step S32). The user input process part 28 inputs the input authentication information 81 retained by the user input process part 28 into the authentication information input field 71 based on the input execution instruction.

When the login history information in the first or second validity level exists, the input authentication information 81 retained by the user input process part 28 does not agree with all the authentication information of the login history information (YES at step S30, NO at step S31, and NO at step S33). This means that, since the target web page 70 or the web page of the service related to the target web page 70 was displayed on the display unit 12 when the input authentication information 81 was inputted before, the input authentication information 81 is changed with respect to the authentication information of the login history information in the first or second validity level. In this case, the safety process part 24 outputs the input execution instruction in the second safety level process (step S34). The user input process part 28 inputs the input authentication information 81 retained by the user input process part 28 into the authentication information input field 71 based on the input execution instruction. At that time, the safety process part 24 displays the above mentioned change confirmation notice on the display unit 12.

When the login history information in the first or second validity level exists, the input authentication information 81 retained in the user input process part 28 does not agree with the authentication information of the login history information in the first or second validity level but the input authentication information 81 agrees with the authentication information of the login history information in the third validity level (YES at step S30, NO at step S31, and YES at step S33). This means that, since the target web page 70 or the web page of the service related to the target webpage 70 was displayed on the display unit 12 when the input authentication information 81 was input before, the input authentication information 81 is incorrect. In this case, the safety process part 24 displays an input yes-or-no selection indicator on the display unit 12 in the third safety level process (step S35). This input yes-or-no selection indicator includes an input yes-or-no selection field in which the user of the user terminal 1 selects, by using the input unit 11, whether or not the input authentication information is inputted into the authentication information input field 71.

When the input of the input authentication information is selected in the input yes-or-no selection field, the safety process part 24 outputs the input execution instruction. In this case, the user input process part 28 inputs the input authentication information 81 retained by the user input process part 28 into the authentication information input field 71 based on the input execution instruction.

On the other hand, when cancellation of the input of the input authentication information is selected in the input yes-or-no selection field, the safety process part 24 outputs the input execution canceling instruction. In this case, the user input process part 28 cancels the input of the input authentication information 81 retained by the user input process part 28 into the authentication information input field 71 based on the input execution canceling instruction.

When the login history information in the first and second validity levels do not exist and the login history information in the third validity level exists, the input authentication information 81 retained by the user input process part 28 does not agree with the authentication information of the login history information in the third validity level (NO at step S30 and NO at step S36). This means that the target web page 70 or the web page of the service related to the target web page 70 was not displayed on the display unit 12 when the input authentication information 81 was inputted before and that the input authentication information 81 is new authentication information. In this case, the safety process part 24 displays, on the display unit 12, the above mentioned input yes-or-no selection indicator including the input yes-or-no field in stead of the above mentioned new input selection indicator including the new input selection field in the fourth safety level process (step S37).

In addition, the safety process part 24 displays the above mentioned new input notice on the display unit 12.

When the input of the input authentication information is selected in the input yes-or-no selection field, the safety process part 24 outputs the input execution instruction. In this case, the user input process part 28 inputs the input authentication information 81 retained by the user input process part 28 into the authentication information input field 71 based on the input execution instruction.

On the other hand, when cancellation of the input of the input authentication information is selected in the input yes-or-no selection field, the safety process part 24 outputs the input execution canceling instruction. In this case, the user input process part 28 cancels the input of the input authentication information 81 retained by the user input process part 28 into the authentication information input field 71 based on the input execution canceling instruction.

When the login history information in the first and second validity levels do not exist and the login history information in the third validity level exists, the input authentication information 81 retained by the user input process part 28 agrees with the authentication information of the login history information in the third validity level (NO at step S30 and YES at step S36). This means that the target web page 70 or the web page of the service related to the target web page 70 was not displayed on the display unit 12 when the input authentication information 81 was inputted before and that the input authentication information 81 is already known but does not correspond to the target URL. In this case, the safety process part 24 outputs the input execution canceling instruction in the fifth safety level process (step S38). In this case, the user input process part 28 cancels the input of the input authentication information 81 retained by the user input process part 28 into the authentication information input field 71 based on the input execution canceling instruction.

EXAMPLE

Referring to FIGS. 4, 5, and 10 to 12, the first to fifth safety level processes (steps S32, S34, S35, S37, and S38) in the above described safety judgment process (step S7) will be specifically explained.

As shown in FIG. 4, login history information "Z", "P", "Q", and "R" are registered in the login information list 40.

The login history information "Z" includes user identification information "U001", an ID "admin" and a password "adminpass" as authentication information (ID-LI) and browsed URLs "http://AAA.com/index.html" and "http://BBB.com".

The login history information "P" includes user identification information "U001", an ID "adminP" and a password "adminpassP" as authentication information (ID-LI), and a browsed URL "http://ppp.com/MY_PAGE/Signin?ID % . . . ".

The login history information "Q" includes user identification information "U001", an ID "adminQ" and a password "adminpassQ" as authentication information (ID-LI), and a browsed URL "http://qqq.com/MY_PAGE/Signin?ID % . . . ".

The login history information "R" includes user identification information "U001", an ID "adminR" and a password "adminpassR" as authentication information (ID-LI), and a browsed URL "http://rrr.com/I_PAGE/Signin?ID % . . . ".

As shown in FIG. 5, service groups "X" and "Y" are registered in the service group information list 50.

The service group "X" includes service URLs of web pages, "http://AAA.com/index.html", "http://TTT.co.eu/", and "http://CCC.co.jp/top/top.html".

The service group "Y" includes service URLs of web pages, "http://BBB.com/", and "http://SSS.co.ru/top/top.html".

Hereinafter, the above mentioned first, second, and third validity levels are referred to as validity levels "1," "2", and "3", respectively. Additionally, in cases of safety levels "1", "2", "3", "4", "5", and "6" described below, the above mentioned first, second, third, fourth, fifth, and sixth safety level processes are executed, respectively.

<Case A>

In this case, a target URL of the target web page 70 displayed on the display unit 12 is "http://ppp.com/MY_PAGE/Signin?ID % . . . ".

At first, judgment of the validity level "1" is performed on the login history information "Z".

(Judgment of the Validity Level "1" for the Login History Information "Z")

The browsed URL in the login history information "Z" is checked with the target URL of the target web page 70 displayed on the display unit 12 based on the validity judgment rule.

Here, a judgment (check) is performed on the browsed URL "http://AAA.com/index.html" and the target URL "http://ppp.com/MY_PAGE/Signin?ID % . . . ". As a result, they do not agree with each other.

A judgment (check) is performed on the browsed URL "http://BBB.com/" and the target URL "http://ppp.com/MY_PAGE/Signin?ID % . . . ". As a result, they do not agree with each other.

In this case, judgment of the validity level "2" is performed.

(Judgment (1) of the Validity Level "2" for the Login History Information "Z")

The browsed URL "http://AAA.com/index.html" in the login history information "Z" is checked with the service URLs of web page in the service group information list 50.

Here, the browsed URL agrees with one of the service URLs of web page in the service group "X".

The service URLs of web page in the service group "X" are checked with the target URL of the target web page 70 displayed on the display unit 12 based on the validity judgment rule.

Here, a judgment (check) is performed on the service URL "http://TTT.com.eu" and the target URL "http://ppp.com/MY_PAGE/Signin?ID % . . . ". As a result, they do not agree with each other.

A judgment (check) is performed on the service URL "http://CCC.co.jp/top/top.html" and the target URL "http://ppp.com/MY_PAGE/Signin?ID % . . . ". As a result, they do not agree with each other.

In this case, judgment of the validity level "2" is performed on the browsed URL other than the browsed URL "http://AAA.com/index.html" in the above mentioned login history information "Z".

(Judgment (2) of the Validity Level "2" to the Login History Information "Z")

The browsed URL "http://BBB.com/index.html" in the login history information "Z" is checked with the service URLs of web page in the service group information list 50.

Here, the browsed URL agrees with one of the service URLs of web page in the service group "Y".

The service URL of web page in the service group "Y" is checked with the target URL of the target web page 70 displayed on the display unit 12 based on the validity judgment rule.

Here, a judgment (check) is performed on the service "URL http://SSS.co.ru/top.html" and the target URL "http://ppp.com/MY_PAGE/Signin?ID % . . . ". As a result, they do not agree with each other.

In this case, since the target URL does not agrees with all the service URLs, the validity level is judged to be "3". Thus, the validity level "3" is added to the login history information "Z" as shown in FIG. 10.

Next, judgment of the validity level "1" is performed on the login history information "P".

(Judgment of the Validity Level "1" for the Login History Information "P")

The browsed URL in the login history information "P" is checked with the target URL of the target web page 70 displayed on the display unit 12 based on the validity judgment rule.

Here, a judgment (check) is performed on the browsed URL "http://ppp.com/MY_PAGE/Signin?ID % . . . " and the target URL "http://ppp.com/MY_PAGE/Signin?ID % . . . ". As a result, they agree with each other.

In this case, since the target URL agrees with the browsed URL, the validity level is judged to be "1". Thus, the validity level "1" is added to the login history information "P" as shown in FIG. 10.

Next, judgment of the validity level "1" is performed on the login history information "Q".

(Judgment of the Validity Level "1" for the Login History Information "Q")

The browsed URL in the login history information "Q" is checked with the target URL of the target web page 70 displayed on the display unit 12 based on the validity judgment rule.

Here, a judgment (check) is performed on the browsed URL "http://qqq.com/MY_PAGE/Signin?ID % . . . " and the target URL "http://ppp.com/MY_PAGE/Signin?ID % . . . ". As a result, they do not agree with each other.

In this case, judgment of the validity level "2" is performed.

(Judgment of the Validity Level "2" for the Login History Information "Q")

The browsed URL "http://qqq.com/MY_PAGE/Signin?ID % . . . " in the login history information "Q" is checked with the service URLs of web page in the service group information list 50. As a result, there is no service group including a service URL which agrees with the browsed URL.

In this case, the validity level is judged to be "3", and thus, the validity level "3" is added to the login history information "Q" as shown in FIG. 10.

Next, judgment of the validity level "1" is performed on the login history information "R".

(Judgment of the Validity Level "1" for the Login History Information "R")

The browsed URL in the login history information "R" is checked with the target URL of the target web page 70 displayed on the display unit 12 based on the validity judgment rule.

Here, a judgment (check) is performed on the browsed URL "http://rrr.com/I_PAGE/Signin?ID % . . . " and the target URL "http://ppp.com/MY_PAGE/Signin?ID % . . . ". As a result, they do not agree with each other.

In this case, judgment of the validity level "2" is performed.

(Judgment of the Validity Level "2" for the Login History Information "R")

The browsed URL "http://rrr.com/I_PAGE/Signin?ID % . . . " in the login history information "R" is checked with the service URLs of web page in the service group information list 50. As a result, there is no service group including a service URL which agrees with the browsed URL.

In this case, the validity level is judged to be "3", and thus, the validity level "3" is added to the login history information "R" as shown in FIG. 10.

Subsequently, judgment of the safety level is performed.

The input authentication information 81 inputted into the authentication information input field of the target web page 70 is assumed to be ID "adminP" and password "adminpassP".

The input authentication information 81 is checked with the authentication information (ID-LI) of the login history information "P" to which the validity level "1" is added. As a result, they agree with each other.

In this case, the safety level is judged to be "1" and the first safety level process (step S32) is executed.

The input authentication information 81 inputted into the authentication information input field in the target web page 70 is assumed to be ID "adminZ" and password "adminpassZ".

The input authentication information 81 is checked with the authentication information (ID-LI) of the login history information "P" to which the validity level "1" is added. As a result, they do not agree with each other.

The input authentication information 81 is checked with the authentication information (ID-LI) of the login history information "Z", "Q", and "R" to which the validity level "3" is added. As a result, they do not agree with each other.

In this case, the safety level is judged to be "2" and the second safety level process (step S34) is executed.

The input authentication information 81 inputted into the authentication information input field in the target web page 70 is assumed to be ID "adminQ" and password "adminpassQ".

The input authentication information 81 is checked with the authentication information (ID-LI) of the login history information "P" to which the validity level "1" is added. As a result, they do not agree with each other.

The input authentication information 81 is checked with the authentication information (ID-LI) of the login history information "Z", "Q", and "R" to which the validity level "3" is added. As a result, the input authentication information 81 agrees with the authentication information (ID-LI) of the login history information "Q".

In this case, the safety level is judged to be "3" and the third safety level process (step S35) is executed.

<Case B>

In this case, a target URL of the target web page 70 displayed on the display unit 12 is "http://TTT.co.eu/".

At first, judgment of the validity level "1" is performed on the login history information "Z".

(Judgment of the Validity Level "1" for the Login History Information "Z")

The browsed URL in the login history information "Z" is checked with the target URL of the target web page 70 displayed on the display unit 12 based on the validity judgment rule.

Here, a judgment (check) is performed on the browsed URL "http://AAA.com/index.html" and the target URL "http://TTT.co.eu". As a result, they do not agree with each other.

A judgment (check) is performed on the browsed URL "http://BBB.com/" and the target URL "http://TTT.co.eu". As a result, they do not agree with each other.

In this case, judgment of the validity level "2" is performed.

(Judgment of the Validity Level "2" for the Login History Information "Z")

The browsed URL "http://AAA.com/index.html" in the login history information "Z" is checked with the service URL of web page in the service group information list 50.

Here, the browsed URL agrees with one of the service URLs of web page in the service group "X".

The service URL of web page in the service group "X" is checked with the target URL of the target web page 70 displayed on the display unit 12 based on the validity judgment rule.

Here, a judgment (check) is performed on the service "URL http://TTT.com.eu" and the target URL "http://TTT.co.eu". As a result, they agree with each other.

Here, since the validity level will not be judged to be "1", judgment on the target URL and the service URL "http://CCC.co.jp/top/top.html" and judgment for a service group other than the above mentioned service group are not performed.

In this case, since the target URL agrees with the service URL, the validity level is judged to be "2". Thus, the validity level "2" is added to the login history information "Z" as shown in FIG. 11.

Next, judgment of the validity level "1" is performed on the login history information "P".

(Judgment of the Validity Level "1" for the Login History Information "p")

The browsed URL in the login history information "P" is checked with the target URL of the target web page 70 displayed on the display unit 12 based on the validity judgment rule.

Here, a judgment (check) is performed on the browsed URL "http://ppp.com/MY_PAGE/Signin?ID % . . . " and the target URL "http://TTT.co.eu/". As a result, they do not agree with each other.

In this case, judgment of the validity level "2" is performed.

(Judgment of the Validity Level "2" for the Login History Information "P")

The browsed URL "http://ppp.com/MY_PAGE/Signin?ID % . . . " in the login history information "P" is checked with the service URLs of web page in the service group information list 50. As a result, there is no service group including a service URL which agrees with the browsed URL.

In this case, the validity level is judged to be "3", and thus, the validity level "3" is added to the login history information "P" as shown in FIG. 11.

Next, judgment of the validity level "1" is performed on the login history information "Q".

(Judgment of the Validity Level "1" for the Login History Information "Q")

The browsed URL in the login history information "Q" is checked with the target URL of the target web page 70 displayed on the display unit 12 based on the validity judgment rule.

Here, a judgment (check) is performed on the browsed URL "http://qqq.com/MY_PAGE/Signin?ID % . . . " and the target URL "http://TTT.co.eu/". As a result, they do not agree with each other.

In this case, judgment of the validity level "2" is performed.

(Judgment of the Validity Level "2" for the Login History Information "Q")

The browsed URL "http://qqq.com/MY_PAGE/Signin?ID % . . . " in the login history information "Q" is checked with the service URLs of web page in the service group information list 50. As a result, there is no service group including a service URL which agrees with the browsed URL.

In this case, the validity level is judged to be "3", and thus, the validity level "3" is added to the login history information "Q" as shown in FIG. 11.

Next, judgment of the validity level "1" is performed on the login history information "R".

(Judgment of the Validity Level "1" for the Login History Information "R")

The browsed URL in the login history information "R" is checked with the target URL of the target web page 70 displayed on the display unit 12 based on the validity judgment rule.

Here, a judgment (check) is performed on the browsed URL "http://rrr.com/I_PAGE/Signin?ID % . . . " and the target URL "http://TTT.co.eu/". As a result, they do not agree with each other.

In this case, judgment of the validity level "2" is performed.

(Judgment of the Validity Level "2" for the Login History Information "R")

The browsed URL "http://rrr.com/I_PAGE/Signin?ID % . . . " in the login history information "R" is checked with the service URLs of web page in the service group information list 50. As a result, there is no service group including a service URL which agrees with the browsed URL.

In this case, the validity level is judged to be "3", and thus, the validity level "3" is added to the login history information "R" as shown in FIG. 11.

Subsequently, judgment of the safety level is performed.

The input authentication information 81 inputted into the authentication information input field in the target web page 70 is assumed to be ID "admin" and password "adminpass".

The input authentication information 81 is checked with the authentication information (ID-LI) of the login history information "Z" to which the validity level "2" is added. As a result, they agree with each other.

In this case, the safety level is judged to be "1" and the first safety level process (step S32) is executed.

The input authentication information 81 inputted into the authentication information input field in the target web page 70 is assumed to be ID "adminZ" and password "adminpassZ".

The input authentication information 81 is checked with the authentication information (ID-LI) of the login history information "Z" to which the validity level "2" is added. As a result, they do not agree with each other.

The input authentication information 81 is checked with the authentication information (ID-LI) of the login history information "p", "Q", and "R" to which the validity level "3" is added. As a result, they do not agree with each other.

In this case, the safety level is "2" and the second safety level process (step S34) is executed.

The input authentication information 81 inputted into the authentication information input field in the target web page 70 is assumed to be ID "adminQ" and password "adminpassQ".

The input authentication information 81 is checked with the authentication information (ID-LI) of the login history information "Z" to which the validity level "2" is added. As a result, they do not agree with each other.

The input authentication information 81 is checked with the authentication information (ID-LI) of the login history information "P", "Q", and "R" to which the validity level "3" is added. As a result, the input authentication information 81 agrees with the authentication information (ID-LI) of the login history information "Q".

In this case, the safety level is judged to be "3" and the third safety level process (step S35) is executed.

<Case C>

As shown in FIG. 12, the validity level "3" is added to the login history information "Z" in the above described case B. That is, the validity level "3" is added to each of the login history information "Z", "P", "Q", and "R". Judgment of the safety level in this case will be explained.

The input authentication information 81 inputted into the authentication information input field of the target web page 70 is assumed to be ID "adminU" and password "adminpassU".

The input authentication information 81 is checked with the authentication information (ID-LI) of the login history information "Z", "P", "Q", and "R" to which the validity level "3" is added. As a result, they do not agree with each other.

In this case, the safety level is judged to be "4", and thus, the fourth safety level process (step S37) is executed.

The input authentication information 81 inputted into the authentication information input field of the target web page 70 is assumed to be ID "adminQ" and password "adminpassQ".

The input authentication information 81 is checked with the authentication information (ID-LI) of the login history information "Z", "P", "Q", and "R" to which the validity level "3" is added. As a result, the input authentication information 81 agrees with the authentication information (ID-LI) of the login history information "Q".

In this case, the safety level is "5", and thus, the fifth safety level process (step S38) is executed.

While the invention has been particularly shown and described with reference exemplary embodiments thereof, the invention is not limited to these embodiments. It will be understood by those skilled in the art that various changes in form and details may be made therein without departing from the spirit and scope of the present invention as defined by the claims.

What is claimed is

1. A web page safety judgment system, comprising:
a user terminal that is connected via a network to a service providing web server which publishes a target web page on said network,
wherein said target web page includes an authentication information input field into which input authentication information is inputted by said user terminal,
said user terminal comprises:
a first validity judgment process part,
a second validity judgment process part,
a third validity judgment process part,
a safety process part,
a display unit that displays said target web page published on said network; and
a storage unit that stores a login information list and a service group information list,
said login information list registers a plurality of login history information respectively including a plurality of authentication information and browsed URL(Uniform Resource Locator)s identifying web pages browsed on said display unit before,
said service group information list registers service groups each of which includes service URLs respectively identifying web pages for which authentication is performed based on a common authentication information,
said first validity judgment process unit checks a target URL identifying said target web page displayed on said display unit with said browsed URLs and judges login history information of said plurality of login history information which includes a browsed URL agreeing with said target URL, is a first validity level,
said second validity judgment process part selects, from said service groups, first service groups each of which includes a service URL agreeing with one of said browsed URLs,
said second validity judgment process part checks said target URL with service URLs included in said first service groups and selects, from said first service groups, a second service group including a service in with said target URL,
said second validity judgment process part judges login history information of said plurality of login history information, which includes a browsed URL agreeing with a service URL included in said second service group, is a second validity level,
said third validity judgment process part judges login history information of said plurality of login history information, which is other than said login history information in said first validity level or said second validity level, is a third validity level,
said safety process part selects a corresponding process from a plurality of predetermined processes for said input authentication information based on existence or absence of said login history information in said first validity level or in said second validity level and on a result of checking said input authentication information with login information in said login history information in said first to third validity levels, said safety process part executes said corresponding process, said service providing web server provides a predetermined service when transmission authentication information agrees with set authentication information retained in said service providing web server, said safe process part, based on existence or absence of said login history information in said first validity level or in said second validity level and on said result of checking said input authentication information with login information in said login history information in said first to third validity levels, transmits said input authentication information as said transmission authentication information in said corresponding process when judging it is safe to transmit said input authentication information for said target web page, and cancels a transmission of said transmission authentication information in said corresponding process when judging it is risky to transmit said input authentication information for said target web page, when said login history information in said first validity level or said second validity level exists, and said input authentication information does not agree with said authentication information of said login history information in said first validity level or said second validity level but agrees with said authentication information of said login history information in said third validity level, said safety process part displays an incorrect input notice and an incorrect input selection indicator on said display unit in said corresponding process, said incorrect input notice indicates that, since said target web page or a web page of a service related to said target web page was displayed on said display unit when said input authentication information was inputted before, said input authentication information is an incorrect input, said incorrect input selection indicator includes an incorrect input selection field in which a user of said user terminal selects, by using an input unit of said user terminal, whether or not said input authentication information is transmitted, and said safety process part transmits said input authentication information as said transmission authentication information when a transmission of said input authentication information is selected in said incorrect input selection field.

2. A web page safety judgment system comprising:

a user terminal that is connected via a network to a service providing web server which publishes a target web page on said network, wherein said target web page includes an authentication information input field into which input authentication information is inputted by said user terminal, said user terminal comprises:
a first validity judgment process part;
a second validity judgment process part;
a third validity judgment process part;
a safety process part;
a display unit that displays said target web page published on said network; and
a storage unit that stores a login information list and a service group information list, said login information list registers a plurality of login history information respectively including a plurality of authentication information and browsed URL(Uniform Resource Locator)s identifying web pages browsed on said display unit before, said service group information list registers service groups each of which includes service URLs respectively identifying web pages for which authentication is performed based on a common authentication information, said first validity judgment process unit checks a target URL identifying said target web page displayed on said display unit with said browsed URLs and judges login history information of said plurality of login history information, which includes a browsed URL agreeing with said target URL, is a first validity level, said second validity judgment process part selects, from said service groups, first service groups each of which includes a service URL agreeing with one of said browsed URLs, said second validity judgment process part checks said target URL with service URLs included in said first service groups and selects, from said first service groups, a second service group including a service URL agreeing with said target URL, said second validity judgment process part judges login history information of said plurality of login history information, which includes a browsed URL agreeing Being with a service URL included in said second service group, is a second validity level, said third validity judgment process part judges login history information of said plurality of login history information, which is other than said login history information in said first validity level or said second validity level, is a third validity level, said safety process part selects a corresponding process from a plurality of predetermined processes for said input authentication information based on existence or absence of said login history information in said first validity level or in said second validity level and on a result of checking said input authentication information with lo in information in said login history information in said first to third validity levels, said safety process part executes said corresponding process said service providing web server provides a predetermined service when transmission authentication information agrees with set authentication information retained in said service providing web server, said safe process part based on existence or absence of said login history information in said first validity level or in said second validity level and on said result of checking said input authentication information with login information in said login history information in said first to third validity levels, transmits said input authentication information as said transmission authentication information in said corresponding process when judging it is safe to transmit said input authentication information for said target web page, and cancels a transmission of said transmission authentication information in said corresponding process when it is risky to transmit said input authentication information for said target web page, when said login history information in said first validity level and said second validity level do not exist, said login history information in said third validity level exists, and said input authentication information does not agree with said authentication information of said login history information in said third validity level, said safety process part displays a new input notice and a new input selection indicator on said display unit in said corresponding process, said new input notice indicates that neither said target web page nor a web page of a service related to said target web page was displayed on said display unit when said input authentication information was input before and that said input authentication information is new authentication information, said new input selection indicator includes a new input selection field in which a user of said user terminal selects, by using an input unit of said user terminal, whether or not said input authentication information is transmitted, and said safety process part transmits said input authentication information as said transmission authentication information when a transmission of said input authentication information is selected in said new input selection field.

3. A web page safety judgment system comprising:

a user terminal that is connected via a network to a service providing web server which publishes a target web page on said network, wherein said target web page includes an authentication information input field into which input authentication information is inputted by said user terminal, said user terminal comprises:

a first validity judgment process part;

a second validity judgment process part;

a third validity judgment process part;

a safety process part;

a display unit that displays said target web page published on said network; and a storage unit that stores a login information list and a service group information list, said login information list registers a plurality of login history information respectively including a plurality of authentication information and browsed URL(Uniform Resource Locator)s identifying web pages browsed on said display unit before, said service group information list registers service groups each of which includes service URLs respectively identifying web pages for which authentication is performed based on a common authentication information, said first validity judgment process unit checks a target URL identifying said target web page displayed on said display unit with said browsed URLs and judges login history information of said plurality of login history information, which includes a browsed URL agreeing with said target URL, is a first validity level, said second validity judgment process part selects, from said service groups, first service groups each of which includes a service URL agreeing with one of said browsed URLs, said second validity judgment process part checks said target URL with service URLs included in said first service groups and selects, from said first service groups, a second service group including a service URL agreeing with said target URL, said second validity judgment process part judges login history information of said plurality of login history information, which includes a browsed URL agreeing with a service URL included in said second service group, is a second validity level, said third validity judgment process part judges login history information of said plurality of login history information, which is other than said login history information in said first validity level or said second validity level, is a third validity level, said safety process part selects a corresponding process from a plurality of predetermined processes for said input authentication information based on existence or absence of said login history information in said first validity level or in said second validity level and on a result of checking said input authentication information with login information in said login history information in said first to third validity levels, said safety process part executes said corresponding process, said service providing web server provides a predetermined service when transmission authentication information agrees with set authentication information retained in said service providing web server, said safety process part, based on existence or absence of said login history information in said first validity level or in said second validity level and on said result of checking said input authentication information with login information in said login history information in said first to third validity levels, transmits said input authentication information as said transmission authentication information in said corresponding process when judging it is safe to transmit said input authentication information for said target web page, and cancels a transmission of said transmission authentication information in said corresponding process when judging it is risky to transmit said input authentication information for said target web page, when said login history information in said first validity level and said second validity level do not exist, said login history information in said third validity level exists, and said input authentication information agrees with said authentication information of said login history information in said third validity level, said safety process part displays a cancellation notice on said display unit and cancels a transmission of said transmission authentication information in said corresponding process, and said cancellation notice indicates that neither said target web page nor a web page of a service related to said target web page was displayed on said display unit when said input authentication information was input before and that said input authentication information is already known but does not correspond to said target URL.

4. A web page safety judgment system comprising:

a user terminal that is connected via a network to a service providing web server which publishes a target web page on said network;

a login information server connected to said network; and a service group information server connected to said network, and wherein said target web page includes an authentication information input field into which input authentication information is inputted by said user terminal, said user terminal comprises:

a first validity judgment process part;

a second validity judgment process part;

a third validity judgment process part;

a safety process part;

a display unit that displays said target web page published on said network; and a storage unit that stores a login information list and a service group information list, said login information list registers a plurality of login history information respectively including a plurality of authentication information and browsed URL(Uniform Resource Locator)s identifying web pages browsed on said display unit before, said service group information list registers service groups each of which includes service URLs respectively identifying web pages for which authentication is performed based on a common authentication information, said first validity judgment process unit checks a target URL identifying said target web page displayed on said display unit with said browsed URLs judges login history information of said plurality of login history information, which includes a browsed URL agreeing with said target URL, is a first validity level, said second validity judgment process part selects, from said service groups, first service groups each of which includes a service URL agreeing with one of said browsed URLs, said second validity judgment process part checks said target URL with service URLs included in said first service groups and selects, from said first service groups, a second service group including a service URL agreeing with said target URL, said second validity judgment process part judges login history information of said plurality of login history information, which includes a browsed URL agreeing with a service URL included in said second service group, is a second validity level, said third validity judgment process part judges login history information of said plurality of login history information, which is other than said login history information in said first validity level or said second validity level, is a third validity level, said safety process part selects a corresponding process from a plurality of predetermined processes for said input authentication information based on existence or absence of said login history information in said first validity level or in said second validity level and on a result of checking said input authentication information with login information in said login history information in said first to third validity levels, said safety process part executes said corresponding process, said service providing web server provides a predetermined service when transmission authentication information agrees with set authentication information retained in said service providing web server, said safety process part based on existence or absence of said login history information in said first validity level or in said second validity level and on said result of checking said input authentication information with login information in said login history information in said first to third validity levels, transmits said input authentication information as said transmission authentication information in said corresponding process when judging it is safe to transmit said input authentication information for said target web page, and cancels a transmission of said transmission authentication information in said corresponding process when it is risky to transmit said input authentication information for said target web page, said user terminal further comprises:

a history registration process part that when said transmission authentication information is transmitted, generates new login history information including authentication information corresponding to said transmission authentication information and a browsed URL corresponding to said target URL and registers said new login history information to said login information list, said plurality of login history information registered in said login information list respectively include user identification information identifying said user terminal, said user terminal further comprises:

a login information list acquisition process part that transmits a login information list acquisition request including said user identification information to said login information server in order to acquire said login information list; and a login information list updating process part that transmits a login information list updating request including said new login history information and said user identification information to said login information server in order to cause said login information server to update said login information list, said login information server comprises:

a login information list storage unit that stores login information lists respectively corresponding to user terminals, a login information list transmitter unit that selects, from said login information lists stored in said login information list storage unit, said login information list including user identification information agreeing with said user identification information of said login information list acquisition request and transmits said login information list to said user terminal; and a login information list updating unit that selects, from said login information lists stored in said login information list storage unit, said login information list including user identification information agreeing with said user identification information in said login information list updating request and registers said new login history information to said login information list, said user terminal further comprises:

a service group information list acquisition process part that transmit a service group information acquisition request to said service group information server in order to acquire said service group information list, and said service group information server comprises:

a service group information list storage unit that stores said service group information list as a latest service group information list; and a service group information list transmitter unit that transmits a copy of said service group information list stored in said service group information list storage unit to said user terminal based on said service group information list acquisition request.

5. The web page safety judgment system according to claim 1, further comprising:

a blacklist server connected to said network, and wherein said user terminal further comprises:

a blacklist acquisition process part that transmits a blacklist acquisition request to said blacklist server in order to acquire a blacklist in which harmful URLs respectively identifying harmful web pages are registered, said blacklist server comprises:

a blacklist storage unit that stores a blacklist; and a transmitter unit that transmits a copy of said blacklist stored in said blacklist storage unit to said user terminal based on said blacklist acquisition request, said user terminal further comprises:

a blacklist judgment process part that judges whether or not said target URL of said target web page displayed on said display unit agrees with said harmful URLs of said blacklist, said safety process part cancels a transmission of said transmission authentication information when said target URL of said target web page displayed on said display unit agrees with one of said harmful URLs, and said first to third validity judgment process parts respectively execute judgments of said first to third validity levels when said target URL of said target web page displayed on said display unit does not agree with any of said harmful URLs.

6. The web page safety judgment system according to claim 1, wherein said storage unit registers candidate authentication information in advance, said user terminal further comprises:

an automatic input process part that detects said authentication information input field of said target web page displayed on said display unit, reads said candidate authentication information from said storage unit and retains said candidate authentication information as said input authentication information, said safety process part outputs an input execution instruction when judging it is safe to transmit said input authentication information for said target web page, said safety process part outputs an input execution cancelling instruction when judging it is risky to transmit said input authentication information for said target web page, said automatic input process part inputs said input authentication information retained by said automatic input process part into said authentication information input field based on said input execution instruction, and said automatic input process part cancels an input of said input authentication information retained by said automatic input process part into said authentication information input field based on said input execution cancelling instruction.

7. The web page safety judgment system according to claim 1, wherein said user terminal further comprises:

a user input process part that detects said authentication information input field of said target web page displayed on said display unit, displays, on said display unit, a provisional input indicator including another authentication information input field other than said authentication input field and retains, as said input authentication information, authentication information inputted into said another authentication input field by a user of said user terminal, said safety process part outputs an input execution instruction when judging it is safe to transmit said input authentication information for said target web page, said safety process part outputs an input execution cancelling instruction when judging it is risky to transmit said input authentication information for said target web page, said user input process part inputs said input authentication information retained by said user input process part into said authentication information input field based on said input execution instruction, and said user input process part cancels an input of said input authentication information retained by said user input process part into said authentication information input field based on said input execution cancelling instruction.

8. A web page safety judgment method, performable by at least one processor, comprising:

displaying, by the at least one processor on a display unit of a user terminal, a target web page published on a network by a service providing web server and including an authentication information input field into which authentication information is inputted;

referring, by the at least one processor, to a login information list that registers a plurality of login history information respectively including a plurality of authentication information and browsed URL(Uniform Resource Locator)s identifying web pages browsed on said display unit before;

checking, by the at least one processor, a target URL identifying said target web page displayed on said display unit with said browsed URLs;

judging, by the at least one processor, login history information of said plurality of login history information, which includes a browsed URL agreeing with said target URL, is a first validity level;

referring, by the at least one processor, to a service group information list that registers service groups each of which includes service URLs respectively identifying web pages for which authentication is performed based on a common authentication information;

selecting, by the at least one processor, from said service groups, first service groups each of which includes a service URL agreeing with one of said browsed URLs;

checking, by the at least one processor, said target URL with service URLs included in said first service groups;

selecting, by the at least one processor, from said first service groups, a second service group including a service URL agreeing with said target URL;

judging, by the at least one processor, login history information of said plurality of login history information, which includes a browsed URL agreeing with a service URL included in said second service group, is a second validity level;

judging, by the at least one processor, login history information of said plurality of login history information, which is other than said login history information in said first validity level or said second validity level, is a third validity level;

selecting, by the at least one processor, a corresponding process from a plurality of predetermined processes for said input authentication information based on existence or absence of said login history information in said first validity level or in said second validity level and on a result of checking said input authentication information with login information in said login history information in said first to third validity levels;

executing, by the at least one processor, said corresponding process;

based on existence or absence of said login history information in said first validity level or in said second validity level and on said result of checking said input authentication information with login information in said login history information in said first to third validity levels, transmitting, by the at least one processor, said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;

when said login history information in said first validity level or said second validity level exists, and said input authentication information does not agree with said authentication information of said login history information in said first validity level or said second validity level but agrees with said authentication information of said login history information in said third validity level, displaying, by the at least one processor, an incorrect input notice and an incorrect input selection indicator on said display unit in said corresponding process, wherein said incorrect input notice indicates that, since said target web page or a web page of a service related to said target web page was displayed on said display unit when said input authentication information was inputted before, said input authentication information is an incorrect input and said incorrect input selection indicator includes an incorrect input selection field in which a user of said user terminal selects, by using an input unit of said user terminal, whether or not said input authentication information is transmitted; and transmitting, by the at least one processor, said input authentication information as said transmission authentication information when a transmission of said input authentication information is selected in said incorrect input selection field.

9. A non-transitory computer readable storage medium which records a computer-readable program that when executed causes a computer to perform a web page safety judgment method comprising:

displaying, on a display unit of a user terminal, a target web page published on a network by a service providing web server and including an authentication information input field into which authentication information is inputted;

referring to a login information list that registers a plurality of login history information respectively including a plurality of authentication information and browsed URL(Uniform Resource Locator)s identifying web pages browsed on said display unit before;

checking a target URL identifying said target web page displayed on said display unit with said browsed URLs;

judging login history information of said plurality of login history information, which includes a browsed URL agreeing with said target URL, is a first validity level;

referring to a service group information list that registers service groups each of which includes service URLs respectively identifying web pages for which authentication is performed based on a common authentication information;

selecting, from said service groups, first service groups each of which includes a service URL agreeing with one of said browsed URLs;

checking said target URL with service URLs included in said first service groups;

selecting, from said first service groups, a second service group including a service URL agreeing with said target URL;

judging login history information of said plurality of login history information, which includes a browsed URL agreeing with a service URL included in said second service group, is a second validity level;

judging a login history information of said plurality of login history information, which is other than said login history information in said first validity level or said second validity level, is a third validity level;

selecting a corresponding process from a plurality of predetermined processes for said input authentication information based on existence or absence of said login history information in said first validity level or in said second validity level and on a result of checking said input authentication information with login information in said login history information in said first to third validity levels;

executing said corresponding process;

based on existence or absence of said login history information in said first validity level or in said second validity level and on said result of checking said input authentication information with login information in said login history information in said first to third validity levels, transmitting said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;

when said login history information in said first validity level or said second validity level exists, and said input authentication information does not agree with said authentication information of said login history information in said first validity level or said second validity level but agrees with said authentication information of said login history information in said third validity level, displaying an incorrect input notice and an incorrect input selection indicator on said display unit in said corresponding process, wherein said incorrect input notice indicates that, since said target web page or a web page of a service related to said target web page was displayed on said display unit when said input authentication information was inputted before, said input authentication information is an incorrect input and said incorrect input selection indicator includes an incorrect input selection field in which a user of said user terminal selects, by using an input unit of said user terminal, whether or not said input authentication information is transmitted; and transmitting said input authentication information as said transmission authentication information when a transmission of said input authentication information is selected in said incorrect input selection field.

10. A web page safety judgment method, performable by at least one processor, comprising:

displaying, by the at least one processor on a display unit of a user terminal, a target web page published on a network by a service providing web server and including an authentication information input field into which authentication information is inputted;

referring, by the at least one processor, to a login information list that registers a plurality of login history information respectively including a plurality of authentication information and browsed URL(Uniform Resource Locator)s identifying web pages browsed on said display unit before;

checking, by the at least one processor, a target URL identifying said target web page displayed on said display unit with said browsed URLs;

judging, by the at least one processor, login history information of said plurality of login history information, which includes a browsed URL agreeing with said target URL, is a first validity level;

referring, by the at least one processor, to a service group information list that registers service groups each of which includes service URLs respectively identifying web pages for which authentication is performed based on a common authentication information;

selecting, by the at least one processor, from said service groups, first service groups each of which includes a service URL agreeing with one of said browsed URLs;

checking, by the at least one processor, said target URL with service URLs included in said first service groups;

selecting, by the at least one processor, from said first service groups, a second service group including a service URL agreeing with said target URL;

judging, by the at least one processor, login history information of said plurality of login history information, which includes a browsed URL agreeing with a service URL included in said second service group, is a second validity level;

judging, by the at least one processor, login history information of said plurality of login history information, which is other than said login history information in said first validity level or said second validity level, is a third validity level;

selecting, by the at least one processor, a corresponding process from a plurality of predetermined processes for said input authentication information based on existence or absence of said login history information in said first validity level or in said second validity level and on a result of checking said input authentication information with login information in said login history information in said first to third validity levels;

executing, by the at least one processor, said corresponding process;

based on existence or absence of said login history information in said first validity level or in said second validity level and on said result of checking said input authentication information with login information in said login history information in said first to third validity levels, transmitting, by the at least one processor, said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;

when said login history information in said first validity level and said second validity level do not exist, said login history information in said third validity level exists, and said input authentication information does not agree with said authentication information of said login history information in said third validity level, displaying, by the at least one processor, a new input notice and a new input selection indicator on said display unit in said corresponding process, wherein said new input notice indicates that neither said target web page nor a web page of a service related to said target web page was displayed on said display unit when said input authentication information was input before and that said input authentication information is new authentication information and said new input selection indicator includes a new input selection field in which a user of said user terminal selects, by using an input unit of said user terminal, whether or not said input authentication information is transmitted; and transmitting, by the at least one processor, said input authentication information as said transmission authentication information when a transmission of said input authentication information is selected in said new input selection field.

11. A web page safety judgment method, performable by at least one processor, comprising:

displaying, by the at least one processor on a display unit of a user terminal, a target web page published on a network by a service providing web server and including an authentication information input field into which authentication information is inputted;

referring, by the at least one processor, to a login information list that registers a plurality of login history information respectively including a plurality of authentication information and browsed URL(Uniform Resource Locator)s identifying web pages browsed on said display unit before;

checking, by the at least one processor, a target URL identifying said target web page displayed on said display unit with said browsed URLs;

judging, by the at least one processor, login history information of said plurality of login history information, which includes a browsed URL agreeing with said target URL, is a first validity level;

referring, by the at least one processor, to a service group information list that registers service groups each of which includes service URLs respectively identifying web pages for which authentication is performed based on a common authentication information;

selecting, by the at least one processor, from said service groups, first service groups each of which includes a service URL agreeing with one of said browsed URLs;

checking, by the at least one processor, said target URL with service URLs included in said first service groups;

selecting, by the at least one processor, from said first service groups, a second service group including a service URL agreeing with said target URL;

judging, by the at least one processor, login history information of said plurality of login history information, which includes a browsed URL agreeing with a service URL included in said second service group, is a second validity level;

judging, by the at least one processor, login history information of said plurality of login history information, which is other than said login history information in said first validity level or said second validity level, is a third validity level;

selecting, by the at least one processor, a corresponding process from a plurality of predetermined processes for said input authentication information based on existence or absence of said login history information in said first validity level or in said second validity level and on a result of checking said input authentication information with login information in said login history information in said first to third validity levels;

executing, by the at least one processor, said corresponding process;

based on existence or absence of said login history information in said first validity level or in said second validity level and on said result of checking said input authentication information with login information in said login history information in said first to third validity levels, transmitting, by the at least one processor, said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server; and when said login history information in said first validity level and said second validity level do not exist, said login history information in said third validity level exists, and said input authentication information agrees with said authentication information of said login history information in said third validity level, displaying, by the at least one processor, a cancellation notice on said display unit and cancels a transmission of said transmission authentication information in said corresponding process, wherein said cancellation notice indicates that neither said target web page nor a web page of a service related to said target web page was displayed on said display unit when said input authentication information was input before and that said input authentication information is already known but does not correspond to said target URL.

12. A web page safety judgment method, performable by at least one processor, comprising:

displaying, by the at least one processor on a display unit of a user terminal, a target web page published on a network by a service providing web server and including an authentication information input field into which authentication information is inputted;

referring, by the at least one processor, to a login information list that registers a plurality of login history information respectively including a plurality of authentication information and browsed URL(Uniform Resource Locator)s identifying web pages browsed on said display unit before;

checking, by the at least one processor, a target URL identifying said target web page displayed on said display unit with said browsed URLs;

judging, by the at least one processor, login history information of said plurality of login history information, which includes a browsed URL agreeing with said target URL, is a first validity level;

referring, by the at least one processor, to a service group information list that registers service groups each of which includes service URLs respectively identifying web pages for which authentication is performed based on a common authentication information;

selecting, by the at least one processor, from said service groups, first service groups each of which includes a service URL agreeing with one of said browsed URLs;

checking, by the at least one processor, said target URL with service URLs included in said first service groups;

selecting, by the at least one processor, from said first service groups, a second service group including a service URL agreeing with said target URL;

judging, by the at least one processor, login history information of said plurality of login history information, which includes a browsed URL agreeing with a service URL included in said second service group, is a second validity level;

judging, by the at least one processor, login history information of said plurality of login history information, which is other than said login history information in said first validity level or said second validity level, is a third validity level;

selecting, by the at least one processor, a corresponding process from a plurality of predetermined processes for said input authentication information based on existence or absence of said login history information in said first validity level or in said second validity level and on a result of checking said input authentication information with login information in said login history information in said first to third validity levels;

executing, by the at least one processor, said corresponding process;

based on existence or absence of said login history information in said first validity level or in said second validity level and on said result of checking said input authentication information with login information in said login history information in said first to third validity levels, transmitting, by the at least one processor, said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;

when said transmission authentication information is transmitted, generating, by the at least one processor, new login history information including authentication information corresponding to said transmission authentication information and a browsed URL corresponding to said target URL;

registering, by the at least one processor, said new login history information to said login information list, wherein said plurality of login history information registered in said login information list respectively include user identification information identifying said user terminal;

transmitting, by the at least one processor, a login information list acquisition request including said user identification information to a login information server connected to said network in order to acquire said login information list;

transmitting, by the at least one processor, a login information list updating request including said new login history information and said user identification information to said login information server in order to cause said login information server to update said login information list, wherein said login information server comprises:

a login information list storage unit that stores login information lists respectively corresponding to user terminals;

a login information list transmitter unit that selects, from said login information lists stored in said login information list storage unit, said login information list including user identification information agreeing with said user identification information of said login information list acquisition request and transmits said login information list to said user terminal; and
a login information list updating unit that selects, from said login information lists stored in said login information list storage unit, said login information list including user identification information agreeing with said user identification information in said login information list updating request and registers said new login history information to said login information list; and
transmitting a service group information acquisition request to a service group information server connected to said network in order to acquire said service group information list,
wherein said service group information server comprises:
a service group information list storage unit that stores said service group information list as a latest service group information list; and
a service group information list transmitter unit that transmits a copy of said service group information list stored in said service group information list storage unit to said user terminal based on said service group information list acquisition request.

13. A non-transitory computer readable storage medium which records a computer-readable program that when executed causes a computer to perform a web page safety judgment method comprising:
displaying, on a display unit of a user terminal as said computer, a target web page published on a network by a service providing web server and including an authentication information input field into which authentication information is inputted;
referring to a login information list that registers a plurality of login history information respectively including a plurality of authentication information and browsed URL(Uniform Resource Locator)s identifying web pages browsed on said display unit before;
checking a target URL identifying said target web page displayed on said display unit with said browsed URLs;
judging login history information of said plurality of login history information, which includes a browsed URL agreeing with said target URL, is a first validity level;
referring to a service group information list that registers service groups each of which includes service URLs respectively identifying web pages for which authentication is performed based on a common authentication information;
selecting, from said service groups, first service groups each of which includes a service URL agreeing with one of said browsed URLs;
checking said target URL with service URLs included in said first service groups;
selecting, from said first service groups, a second service group including a service URL agreeing with said target URL;
judging login history information of said plurality of login history information, which includes a browsed URL agreeing with a service URL included in said second service group, is a second validity level;
judging login history information of said plurality of login history information, which is other than said login history information in said first validity level or said second validity level, is a third validity level;
selecting a corresponding process from a plurality of predetermined processes for said input authentication information based on existence or absence of said login history information in said first validity level or in said second validity level and on a result of checking said input authentication information with login information in said login history information in said first to third validity levels;
executing said corresponding process;
based on existence or absence of said login history information in said first validity level or in said second validity level and on said result of checking said input authentication information with login information in said login history information in said first to third validity levels, transmitting said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;
when said login history information in said first validity level and said second validity level do not exist, said login history information in said third validity level exists, and said input authentication information does not agree with said authentication information of said login history information in said third validity level, displaying a new input notice and a new input selection indicator on said display unit in said corresponding process, wherein said new input notice indicates that neither said target web page nor a web page of a service related to said target web page was displayed on said display unit when said input authentication information was input before and that said input authentication information is new authentication information and said new input selection indicator includes a new input selection field in which a user of said user terminal selects, by using an input unit of said user terminal, whether or not said input authentication information is transmitted; and
transmitting said input authentication information as said transmission authentication information when a transmission of said input authentication information is selected in said new input selection field.

14. A non-transitory computer readable storage medium which records a computer-readable program that when executed causes a computer to perform a web page safety judgment method comprising:
displaying, on a display unit of a user terminal as said computer, a target web page published on a network by a service providing web server and including an authentication information input field into which authentication information is inputted;
referring to a login information list that registers a plurality of login history information respectively including a plurality of authentication information and browsed URL(Uniform Resource Locator)s identifying web pages browsed on said display unit before;
checking a target URL identifying said target web page displayed on said display unit with said browsed URLs;
judging login history information of said plurality of login history information, which includes a browsed URL agreeing with said target URL, is a first validity level;
referring to a service group information list that registers service groups each of which includes service URLs respectively identifying web pages for which authentication is performed based on a common authentication information;

selecting, from said service groups, first service groups each of which includes a service URL agreeing with one of said browsed URLs;

checking said target URL with service URLs included in said first service groups;

selecting, from said first service groups, a second service group including a service URL agreeing with said target URL;

judging login history information of said plurality of login history information, which includes a browsed URL agreeing with a service URL included in said second service group, is a second validity level;

judging login history information of said plurality of login history information, which is other than said login history information in said first validity level or said second validity level, is a third validity level;

selecting a corresponding process from a plurality of predetermined processes for said input authentication information based on existence or absence of said login history information in said first validity level or in said second validity level and on a result of checking said input authentication information with login information in said login history information in said first to third validity levels;

executing said corresponding process;

based on existence or absence of said login history information in said first validity level or in said second validity level and on said result of checking said input authentication information with login information in said login history information in said first to third validity levels, transmitting said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server; and when said login history information in said first validity level and said second validity level do not exist, said login history information in said third validity level exists, and said input authentication information agrees with said authentication information of said login history information in said third validity level, displaying a cancellation notice on said display unit and cancels a transmission of said transmission authentication information in said corresponding process, wherein said cancellation notice indicates that neither said target web page nor a web page of a service related to said target web page was displayed on said display unit when said input authentication information was input before and that said input authentication information is already known but does not correspond to said target URL.

15. A non-transitory computer readable storage medium which records a computer-readable program that when executed causes a computer to perform a web page safety judgment method comprising:

displaying, on a display unit of a user terminal as said computer, a target web page published on a network by a service providing web server and including an authentication information input field into which authentication information is inputted;

referring to a login information list that registers a plurality of login history information respectively including a plurality of authentication information and browsed URL(Uniform Resource Locator)s identifying web pages browsed on said display unit before;

checking a target URL identifying said target web page displayed on said display unit with said browsed URLs;

judging login history information of said plurality of login history information, which includes a browsed URL agreeing with said target URL, is a first validity level;

referring to a service group information list that registers service groups each of which includes service URLs respectively identifying web pages for which authentication is performed based on a common authentication information;

selecting, from said service groups, first service groups each of which includes a service URL agreeing with one of said browsed URLs;

checking said target URL with service URLs included in said first service groups;

selecting, from said first service groups, a second service group including a service URL agreeing with said target URL;

judging login history information of said plurality of login history information, which includes a browsed URL agreeing with a service URL included in said second service group, is a second validity level;

judging login history information of said plurality of login history information, which is other than said login history information in said first validity level or said second validity level, is a third validity level;

selecting a corresponding process from a plurality of predetermined processes for said input authentication information based on existence or absence of said login history information in said first validity level or in said second validity level and on a result of checking said input authentication information with login information in said login history information in said first to third validity levels;

executing said corresponding process;

based on existence or absence of said login history information in said first validity level or in said second validity level and on said result of checking said input authentication information with login information in said login history information in said first to third validity levels, transmitting said input authentication information as transmission authentication information in said corresponding process when judging it is safe to transmit said input authentication information for said target web page or canceling a transmission of said transmission authentication information in said corresponding process when judging it is risky to transmit said input authentication information for said target web page, wherein said service providing web server provides a predetermined service when said transmission authentication information agrees with set authentication information retained in said service providing web server;

when said transmission authentication information is transmitted, generating new login history information including authentication information corresponding to said transmission authentication information and a browsed URL corresponding to said target URL;

registering said new login history information to said login information list, wherein said plurality of login history information registered in said login information list respectively include user identification information identifying said user terminal;

transmitting a login information list acquisition request including said user identification information to a login information server connected to said network in order to acquire said login information list;

transmitting a login information list updating request including said new login history information and said user identification information to said login information server in order to cause said login information server to update said login information list, wherein said login information server comprises:

a login information list storage unit that stores login information lists respectively corresponding to user terminals;

a login information list transmitter unit that selects, from said login information lists stored in said login information list storage unit, said login information list including user identification information agreeing with said user identification information of said login information list acquisition request and transmits said login information list to said user terminal; and a login information list updating unit that selects, from said login information lists stored in said login information list storage unit, said login information list including user identification information agreeing with said user identification information in said login information list updating request and registers said new login history information to said login information list; and transmitting a service group information acquisition request to a service group information server connected to said network in order to acquire said service group information list, wherein said service group information server comprises:

a service group information list storage unit that stores said service group information list as a latest service group information list; and a service group information list transmitter unit that transmits a copy of said service group information list stored in said service group information list storage unit to said user terminal based on said service group information list acquisition request.

16. The web page safety judgment system according to claim 1, wherein when said login history information in said first validity level or said second validity level exists and said input authentication information agrees with said authentication information in said login history information in said first validity level or said second validity level, said safety process part transmits, as said transmission authentication information, said input authentication information inputted into said authentication information input field in said corresponding process.

17. The web page safety judgment system according to claim 1, wherein when said login history information in said first validity level or said second validity level exists and said input authentication information does not agree with said authentication information in said plurality of login history information, said safety process part displays a change confirmation notice on said display unit and transmits, as said transmission authentication information, said input authentication information inputted into said authentication information input field in said corresponding process, and said change confirmation notice indicates that, since said target web page or a web page of a service related to said target web page was displayed on said display unit when said input authentication information was inputted before, said input authentication information is changed with respect to said authentication information of said login history information in said first validity level or said second validity level.

* * * * *